(12) United States Patent
Tofte et al.

(10) Patent No.: US 10,275,834 B1
(45) Date of Patent: *Apr. 30, 2019

(54) LOSS MITIGATION IMPLEMENTING UNMANNED AERIAL VEHICLES (UAVS)

(71) Applicant: State Farm Mutual Automobile Insurance Company, Bloomington, IL (US)

(72) Inventors: Nathan L Tofte, Downs, IL (US); Timothy W Ryan, Hudson, IL (US); Nathan W Baumann, Bloomington, IL (US); Michael Shawn Jacob, Le Roy, IL (US); Joshua David Lillie, Bloomington, IL (US); Brian N Harvey, Bloomington, IL (US); Roxane Lyons, Chenoa, IL (US); Rosemarie Geier Grant, Ellsworth, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/045,851

(22) Filed: Jul. 26, 2018

Related U.S. Application Data

(63) Continuation of application No. 14/858,076, filed on Sep. 18, 2015.

(60) Provisional application No. 62/209,963, filed on Aug. 26, 2015, provisional application No. 62/209,755, filed on Aug. 25, 2015, provisional application No. 62/209,627, filed on Aug. 25, 2015, provisional application No. 62/208,201, filed on Aug. 21, 2015, (Continued)

(51) Int. Cl.
*G06Q 40/08* (2012.01)

(52) U.S. Cl.
CPC .................... *G06Q 40/08* (2013.01)

(58) Field of Classification Search
USPC ........................................................ 705/40
See application file for complete search history.

(56) References Cited

U.S. PATENT DOCUMENTS 6,166,729 A   12/2000  Acosta
7,480,715 B1   1/2009  Barker
(Continued)

OTHER PUBLICATIONS

Office Action issued in U.S. Appl. No. 14/858,034 dated Apr. 3, 2018.

(Continued)

*Primary Examiner* — Tien C Nguyen

(57) ABSTRACT

Unmanned aerial vehicles (UAVs) may facilitate insurance-related tasks. UAVs may actively be dispatched to an insured asset and the area surrounding an insured asset, such as with the policyholder or insured's permission and collect data related to the insured asset, such as images, video, audio, weather conditions, thermal signatures, wood and soil samples, etc., and transmit this data to a computing device. The computing device may be associated with and/or utilized by an insurance provider to perform insurance-related tasks, such as processing the data to determine an amount of risk associated with the insured asset. If the amount of risk has increased, the computing device may provide a recommendation to a mobile device of the policyholder on how to reduce the risk such that corrective action may be taken. Insurance discounts may be provided based upon following recommendations that mitigate risk.

20 Claims, 6 Drawing Sheets

Related U.S. Application Data provisional application No. 62/207,421, filed on Aug. 20, 2015, provisional application No. 62/207,127, filed on Aug. 19, 2015, provisional application No. 62/053,519, filed on Sep. 22, 2014.

(56) References Cited

U.S. PATENT DOCUMENTS

| | | |
|---|---|---|
| 7,809,587 B2 | 10/2010 | Dorai |
| 7,889,931 B2 | 2/2011 | Webb |
| 7,912,738 B1 | 3/2011 | Martin |
| 7,953,615 B2 | 5/2011 | Aquila |
| 8,095,391 B2 | 1/2012 | Obora et al. |
| 8,239,220 B2 | 8/2012 | Kidd |
| 8,265,963 B1 | 9/2012 | Hanson |
| 8,346,578 B1 | 1/2013 | Hopkins, III |
| 8,374,957 B1 | 2/2013 | Garcia |
| 8,401,878 B2 | 3/2013 | Stender et al. |
| 8,527,305 B1 | 9/2013 | Hanson |
| 8,537,338 B1 | 9/2013 | Medasani |
| 8,543,486 B2 | 9/2013 | Donoho |
| 8,630,820 B2 | 1/2014 | Amis |
| 8,650,106 B1 | 2/2014 | Hopkins, III |
| 8,700,434 B1 | 4/2014 | DeLong |
| 8,712,893 B1 | 4/2014 | Brandmaier et al. |
| 8,799,034 B1 | 8/2014 | Brandmaier |
| 8,818,572 B1 | 8/2014 | Tofte et al. |
| 9,019,092 B1 | 4/2015 | Brandmaier |
| 9,129,355 B1 | 9/2015 | Harvey et al. |
| 9,505,494 B1 | 11/2016 | Marlow et al. |
| 9,563,201 B1 | 2/2017 | Tofte et al. |
| 9,612,598 B2 | 4/2017 | Schultz et al. |
| 9,691,103 B1 | 6/2017 | Hopkins, III |
| 9,754,325 B1 | 9/2017 | Konrardy |
| 9,792,656 B1 | 10/2017 | Konrardy |
| 9,870,609 B2 | 1/2018 | Kompalli et al. |
| 9,875,509 B1 | 1/2018 | Harvey et al. |
| 9,894,327 B1 | 2/2018 | Jacob |
| 9,972,054 B1 | 5/2018 | Konrardy |
| 2002/0007225 A1 | 1/2002 | Costello |
| 2002/0055861 A1 | 5/2002 | King |
| 2003/0154111 A1 | 8/2003 | Dutra |
| 2004/0088198 A1 | 5/2004 | Childress |
| 2004/0243423 A1 | 12/2004 | Rix |
| 2005/0080649 A1 | 4/2005 | Alvarez |
| 2008/0091490 A1 | 4/2008 | Abrahams |
| 2008/0255887 A1 | 10/2008 | Gruter |
| 2009/0002364 A1 | 1/2009 | Witte, II |
| 2009/0027253 A1 | 1/2009 | van Tooren |
| 2009/0055226 A1 | 2/2009 | Tritz |
| 2009/0265193 A1 | 10/2009 | Collins |
| 2010/0250022 A1 | 9/2010 | Hines |
| 2010/0302359 A1 | 12/2010 | Adams |
| 2011/0137443 A1 | 6/2011 | Farahani |
| 2011/0161118 A1 | 6/2011 | Borden |
| 2012/0033821 A1 | 2/2012 | Ohta |
| 2012/0071998 A1 | 3/2012 | Davies |
| 2012/0140041 A1 | 6/2012 | Burgund |
| 2012/0210853 A1 | 8/2012 | Abershitz |
| 2012/0250010 A1 | 10/2012 | Hannay |
| 2012/0303336 A1 | 11/2012 | Becker |
| 2013/0226624 A1 | 8/2013 | Blessman |
| 2014/0019166 A1 | 1/2014 | Swanson et al. |
| 2014/0100889 A1 | 4/2014 | Tofte |
| 2014/0163852 A1 | 6/2014 | Borri |
| 2014/0244078 A1 | 8/2014 | Downey |
| 2014/0257862 A1 | 9/2014 | Billman et al. |
| 2014/0316614 A1 | 10/2014 | Newman |
| 2014/0320651 A1 | 10/2014 | McClatchie et al. |
| 2015/0363717 A1 | 12/2015 | Lim |
| 2016/0063642 A1 | 3/2016 | Luciani et al. |
| 2016/0189303 A1 | 6/2016 | Fuchs |
| 2017/0352100 A1 | 12/2017 | Shreve et al. |

OTHER PUBLICATIONS

Office Action issued in U.S. Appl. No. 14/858,038 dated Mar. 29, 2018.
Office Action issued in U.S. Appl. No. 14/858,073 dated Apr. 20, 2018.
U.S. Appl. No. 14/510,307, filed Oct. 9, 2014.
U.S. Appl. No. 14/510,492, filed Oct. 9, 2014.
U.S. Appl. No. 14/510,536, filed Oct. 9, 2014.
U.S. Appl. No. 14/808,502, filed Jul. 24, 2015.
U.S. Appl. No. 14/858,038, filed Sep. 18, 2015.
U.S. Appl. No. 14/858,052, filed Sep. 18, 2015.
U.S. Appl. No. 14/858,058, filed Sep. 18, 2015.
U.S. Appl. No. 14/510,502, filed Oct. 9, 2014.
U.S. Appl. No. 14/858,034, filed Sep. 18, 2015.
U.S. Appl. No. 14/858,699, filed Sep. 18, 2015.
U.S. Appl. No. 14/858,073, filed Sep. 18, 2015.
U.S. Appl. No. 14/824,859, filed Aug. 12, 2015.
U.S. Appl. No. 14/858,075, filed Sep. 18, 2015.

LOSS MITIGATION IMPLEMENTING UNMANNED AERIAL VEHICLES (UAVS)

CROSS-REFERENCE TO RELATED APPLICATIONS

This application is continuation of and claims the benefit of U.S. patent application Ser. No. 14/858,076, filed Sep. 18, 2015 and entitled "Loss Mitigation Implementing Unmanned Aerial Vehicles (UAVS), which claims the benefit of (1) U.S. Provisional Patent Application No. 62/053,519, entitled "Method of Implementing Unmanned Aerial Vehicles (UAVs)," filed Sep. 22, 2014, (2) U.S. Provisional Patent Application No. 62/209,963, entitled "Disaster Damage Analysis and Loss Mitigation Implementing Unmanned Aerial Vehicles (UAVs)," filed Aug. 26, 2015, (3) U.S. Provisional Patent Application No. 62/207,421 entitled "Insurance Underwriting and Re-Underwriting Implementing Unmanned Aerial Vehicles (UAVs)," filed Aug. 20, 2015, (4) U.S. Provisional Patent Application No. 62/207,127 entitled "Accident Reconstruction Implementing Unmanned Aerial Vehicles (UAVs)," filed Aug. 19, 2015, (5) U.S. Provisional Patent Application No. 62/209,755 entitled "Systems and Methods of Utilizing Unmanned Aerial Vehicles to Detect Insurance Claim Buildup," filed Aug. 25, 2015, (6) U.S. Provisional Patent Application No. 62/209,627 entitled "Systems and Methods for Using Data Collected from Unmanned Aerial Vehicles to Pre-Generate Claims for Insured Approval," filed Aug. 25, 2015, and (7) U.S. Provisional Patent Application No. 62/208,201 entitled "Loss Mitigation Implementing Unmanned Aerial Vehicles (UAVs)," filed Aug. 21, 2015, the disclosure of each of which is hereby expressly incorporated by reference herein in its entirety.

This application is also related to U.S. Nonprovisional patent application Ser. No. 14/824,859 entitled "Accident Fault Determination Implementing Unmanned Aerial Vehicles (UAVs)," filed Aug. 12, 2015, the disclosure of which is hereby expressly incorporated by reference herein in its entirety.

FIELD OF THE DISCLOSURE

The present embodiments relate generally to applications of unmanned aerial vehicles (UAVs). More specifically, the present embodiments relate to using data collected by one or more UAVs to mitigate loss to insured assets.

BACKGROUND

Conventionally, performing insurance-related actions such as insurance policy adjustments, insurance quote calculations, and/or underwriting involve an arduous and time-consuming manual process that requires a large component of human intervention.

The present embodiments may overcome these and/or other deficiencies.

BRIEF SUMMARY

Methods, systems, apparatus, and non-transitory computer-readable media are described that leverage the use of one or more unmanned aerial vehicles (UAVs, or "drones") to facilitate one or more insurance-related tasks. In various embodiments, one or more UAVs may actively survey an insured asset (also referred to herein as "the asset"), such as a home. Upon arrival at an area surrounding the insured asset, the one or more UAVs may collect drone data for the asset, such as images of the asset and/or images of objects in close proximity to the asset, soil samples for soil surrounding the asset, soil and wood samples for trees surrounding the asset, thermal signatures for the asset including temperature data, video, chemical data, weather conditions, audio, etc.

The one or more UAVs may transmit the drone data to a remote server, which may be associated with an insurance provider and/or utilized by an insurance provider, and may analyze the drone data to determine an amount of risk to the insured asset. For example, the external computing device may compare the drone data to previously collected drone data from the initial underwriting and/or a most recent re-underwriting process. Based upon the comparison, the external computing device may identify additional vegetation surrounding the insured asset, aging or dying vegetation surrounding the insured asset, additions to the insured asset such as a new garage and/or swimming pool, changes to the climate associated with the insured asset, changes to the moisture content on the area surrounding the insured asset, changes to the condition of the insured asset, etc.

As a result, the external computing device may provide a recommendation to an insurance policyholder of the insured asset to mitigate risk and/or prevent loss. At a later date, the UAVs may once again collect drone data for the insured asset which may be transmitted to the remote server to determine whether the policyholder complied with the recommendation. As a result, the external computing device may update insurance premiums upon renewal of the insurance policy and/or transmit the updated insurance policy to the policyholder. For example, if the policyholder complies with the recommendation, the insurance premiums may stay the same as in the insurance policy prior to renewal. In another example, if the policyholder does not comply with the recommendation at all, the external computing device may increase the insurance premiums based upon the amount of risk for the insured asset. In addition to increasing the insurance premiums based upon the amount of risk, the external computing device may also provide limitations in insurance coverage, changes in deductibles, exclusions, cancellation, or non-renewal of the insurance policy.

In one aspect, a computer-implemented method of mitigating potential loss using drone data may be provided. The method may include (1) receiving (via one or more processors, and/or wired or wireless communication and/or data transmission) first drone data captured by one or more sensors communicatively coupled to one or more unmanned aerial vehicles, wherein the first drone data corresponds to an asset insured (e.g., house) by an insurance provider via an insurance policy and the first drone data is captured at a first date; (2) analyzing (via the one or more processors) the first drone data corresponding to the insured asset to determine an amount of risk associated with the insured asset and/or (3) providing (via the one or more processors and/or wired or wireless communication and/or data transmission) a recommendation to a policyholder of the insured asset on how to reduce the amount of risk, wherein the recommendation includes a predetermined amount of time for the policyholder to reduce the amount of risk without an adjustment to the insurance policy. The method may further include (4) receiving (via the one or more processors and/or wired or wireless communication and/or data transmission) second drone data captured by the one or more sensors for the one or more unmanned aerial vehicles, wherein the second drone data corresponds to the insured asset and the second drone data is captured at a second date within the predetermined amount of time from the first date; and/or (5) updating (via the one or more processors) insurance policy data for the insurance policy based upon whether the policyholder complies with the provided recommendation according to the second drone data. As a result, insurance cost savings may be provided to property owners that are risk averse and that follow recommendations to reduce the risk to their property. The method may include additional, fewer, or alternative actions, including those discussed elsewhere herein, and may be implemented via one or more processors, and/or via computer-executable instructions stored on non-transitory computer-readable media or medium.

In another aspect, a system of mitigating potential loss using drone data may be provided. The system may include one or more processors, a communication network, and/or a non-transitory, tangible computer-readable memory coupled to the one or more processors and the communication network and storing machine readable instructions, that when executed by the one or more processors, may cause the system to perform various tasks. For example, the instructions may cause the system to: (1) receive, via the communication network, first drone data captured by one or more sensors communicatively coupled to one or more unmanned aerial vehicles, wherein the first drone data corresponds to an asset insured by an insurance provider via an insurance policy and the first drone data is captured at a first date; (2) analyze the first drone data corresponding to the insured asset to determine an amount of risk associated with the insured asset; and/or (3) provide, via the communication network, a recommendation to a policyholder of the insured asset on how to reduce the amount of risk, wherein the recommendation includes a predetermined amount of time for the policyholder to reduce the amount of risk without an adjustment to the insurance policy. The instructions may further cause the system to: (4) receive, via the communication network, second drone data captured by the one or more sensors for the one or more unmanned aerial vehicles, wherein the second drone data corresponds to the insured asset and the second drone data is captured at a second date within the predetermined amount of time from the first date; and/or (5) update insurance policy data for the insurance policy based upon whether the policyholder complies with the provided recommendation according to the second drone data. The system may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an aspect of a particular aspect of the disclosed system and methods, and that each of the figures is intended to accord with a possible aspect thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. System Overview

Figure 1:
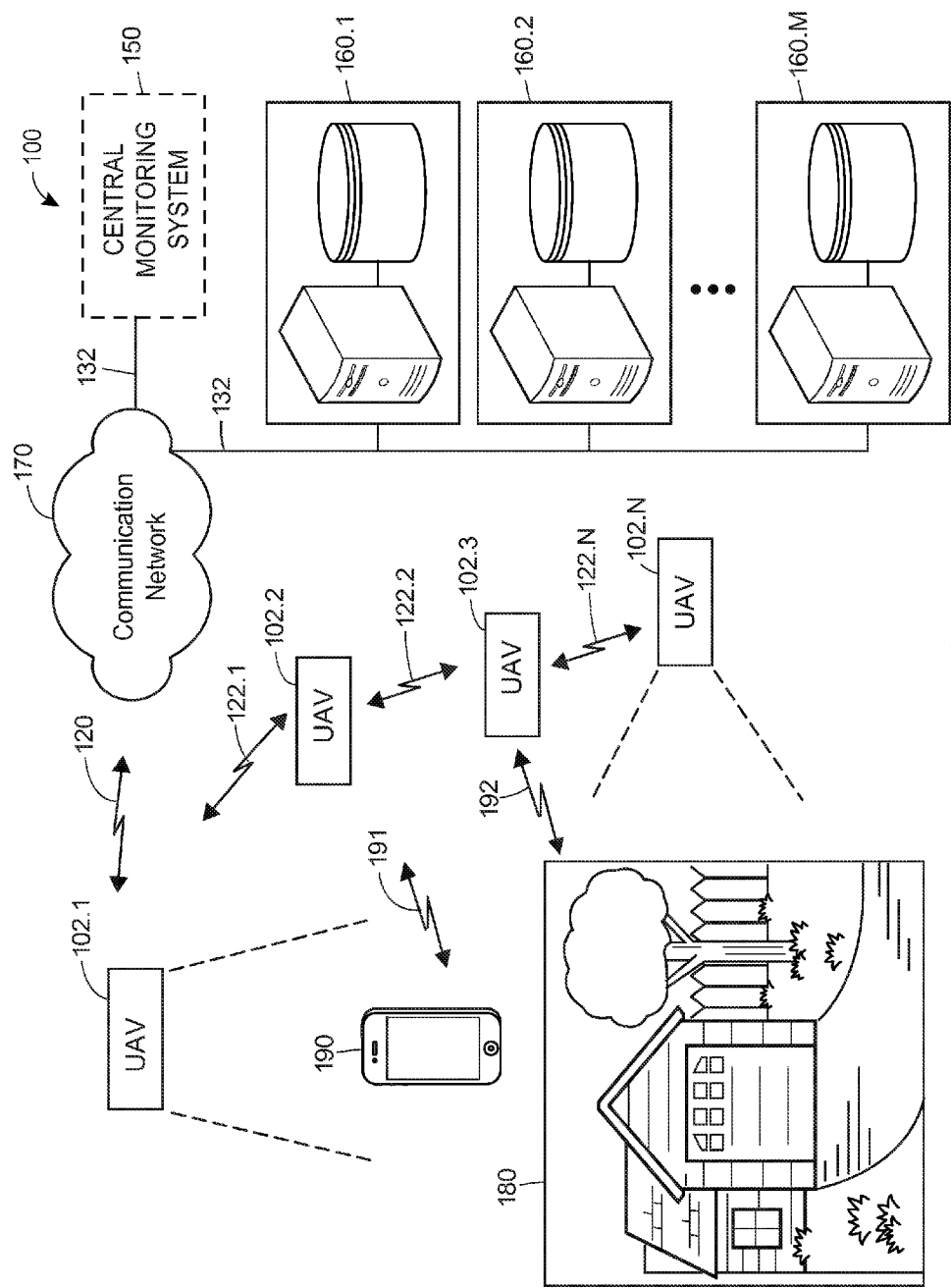
FIG. 1 illustrates an exemplary block diagram of a UAV drone data collection system 100 in accordance with an exemplary aspect of the present disclosure.

FIG. 1 illustrates an exemplary block diagram of a UAV drone data collection system 100. UAV drone data collection system 100 may include N number of UAVs 102.1-102.N, a central monitoring system 150, any suitable number M number of external computing devices 160.1-160.M, a communication network, an insured asset 180, such as an insured property, home, vehicle, infrastructure or other item, and one or more mobile computing devices 190. The UAV drone data collection system 100 may include additional, fewer, or alternate components, including those discussed elsewhere herein.

In various aspects, any suitable number of UAVs 102.1-102.N may communicate with one another and/or with communication network 170. One or more of UAVs 102.1-102.N may receive commands from other UAVs 102 and/or via communication network 170, process these commands, and execute one or more actions based upon these received commands. One or more of UAVs 102.1-102.N may also transmit data to other UAVs 102.1-102.N and/or to communication network 170.

As is further discussed below, by nature of the connectivity of central monitoring system 150 and external computing devices 160.1-160.M to communication network 170, UAVs 102.1-102.N, central monitoring system 150, external computing devices 160.1-160.M, and/or mobile computing device 190 may communicate with one another. For example, UAV 102.1 may communicate with communication network 170 via wireless link 120, while central monitoring system 150 and external computing devices 160.1-160.M may communicate with communication network 170 via wired links 132. To provide another example, mobile computing device 190 may communicate with communication network 170 via wireless link 191 to send data to and receive data from other devices, such as UAVs 102.1-102.N, central monitoring system 150, and/or external computing devices 160.1-160.M, for example, directly and/or via communication network 170. To provide yet another example, one or more vehicles may communicate with communication network 170 via wireless link 192 to send telematics data to other devices, such as UAVs 102.1-102.N, central monitoring system 150, and/or external computing devices 160.1-160.M, for example, directly and/or via communication network 170.

Communications between UAVs 102.1-102.N, central monitoring system 150, external computing devices 160.1-160.M, and/or mobile computing device 190 may occur with or without communications via communication network 170, in some aspects. For example, UAVs 102.1-102.N may communicate with one another directly via wireless links 122.1-122.N, as shown in FIG. 1.

In various aspects, communications between one or more of UAVs 102.1-102.N, central monitoring system 150, one or more of external computing devices 160.1-160.M, and/or mobile computing device 190 may occur in accordance with any suitable number and/or type of communication protocols, which may be wireless communication protocols, wired communication protocols, or any combination thereof. Furthermore, in various aspects, UAVs 102.1-102.N, central monitoring system 150, external computing devices 160.1-160.M, and/or mobile computing device 190 may communicate with one another and/or with communication network 170 using the same or different types of communication protocols.

For example, one or more of UAVs 102.1-102.N may communicate with one another using a short-range wireless communication protocol, such as Wi-Fi protocol, but communicate with communication network 170, and hence with central monitoring system 150 and/or external computing devices 160.1-160.M, via a cellular protocol. To provide another example, central monitoring system 150 and/or external computing devices 160.1-160.M may communicate with communication network 170, and hence with one another, via an Ethernet protocol.

In some aspects, one or more of UAVs 102.1-102.N may communicate with one another to perform tasks as an intelligent group, thereby acting as and communicating with one another as a drone swarm. In other aspects, one or more of UAVs 102.1-102.N may be controlled individually by other UAVs 102.1-102.N, by central monitoring system 150, by one or more external computing devices 160.1-160.M, and/or mobile computing device 190. Individual control of one or more of UAVs 102.1-102.N may be implemented, for example, via a unique UAV address, a unique frequency channel, a unique code (e.g., a pseudo noise code (PN code) or a pseudo random noise code (PRN code), etc.

As will further discussed below, one or more UAVs 102.1-102.N may execute any suitable action based upon a particular application and/or command that is transmitted to one or more UAVs 102.1-102.N, and/or execute any suitable action autonomously or semi-autonomously. For example, one or more UAVs 102.1-102.N may take aerial pictures or collect sensory data associated with the insured asset 180, navigate to an area surrounding the insured asset to perform various actions, collect images, video, audio, soil and/or wood samples of soil and/or trees surrounding the insured asset, etc.

In various aspects, one or more UAVs 102.1-102.N may be implemented as any suitable type of UAV. For example, one or more UAVs 102.1-102.N may be equipped with any suitable number of propellers, wings, and/or engines to facilitate sustained flight, maneuvering, and/or the execution of various tasks as further discussed herein. For example, one or more UAVs 102.1-102.N may be implemented as quadracopters, flying wings, etc., and may utilize any suitable type of navigation and/or maneuvering control, such as collision-avoidance systems, detect-and-avoid systems, etc.

Communication network 170 may include any appropriate combination of wired and/or wireless communication networks. For example, communication network 170 may include any combination of satellites, a local area network (LAN), a metropolitan area network (MAN), a wide area network (WAN), public switched telephone networks (PSTN), etc., and may facilitate a connection to the Internet for one or more devices communicatively coupled thereto. To provide further examples, communication network 170 may include wired telephone and/or cable hardware, satellite, cellular phone communication networks, etc.

Communication network 170 is shown in FIG. 1 as a single network for purposes of brevity, but may represent more than one type of network and/or an aggregation of several networks. For example, one or more of UAVs 102.1-102.N may communicate with satellites via communication network 170 to supplement lost communications (not shown) and/or communicate with central monitoring system 150 via a cellular network system.

Central monitoring system 150 may be implemented as any suitable device configured to communicate with, command, and/or control one or more UAVs 102.1-102.N. Furthermore, central monitoring system 150 may be implemented as any suitable device configured to receive data from one or more UAV's 102.1-102.N, and to share this data or otherwise make this data available to one or more external computing devices 160.1-160.M.

In some aspects, central monitoring system 150 may be configured to communicate with, command, and/or control one or more UAVs 102.1-102.N individually or as part of a UAV swarm protocol. For example, UAVs 102.1-102.N may include a hierarchy of UAVs in which some of UAVs 102.1-102.N may act as "mothership" UAVs and exert control over other UAVs. Aspects include central monitoring system 150 communicating with, commanding, and/or controlling one or more of UAVs 102.1-102.N via any suitable combination of direct control and/or swarm control techniques.

For example, central monitoring system 150 may be implemented as one or more computers, laptops, mobile devices such as a smartphones, tablet computers, netbooks, notebooks, phablets, wearable electronic devices, smart glasses, etc. In one aspect, central monitoring system 150 may be implemented as one or more specialized components configured to monitor and/or control one or more UAVs 102.1-102.N. For example, central monitoring system 150 may be implemented as a computerized system configured to dispatch one or more UAVs 102.1-102.N, to command one or more UAVs 102.1-102.N to perform various data collection tasks, to navigate one or more UAVs 102.1-102.N to a specific geographic location for repairs, recharging and/or refueling, etc.

In some embodiments, central monitoring system 150 may function automatically or semi-automatically with no user intervention or minimal user intervention, respectively. For example, central monitoring system 150 may be implemented with one or more computing devices that are programmed to receive instructions from one or more external computing devices 160.1-160.M, and to command, control, and/or communicate with one or more UAVs 102.1-102.N based upon these instructions.

In other embodiments, central monitoring system 150 may be staffed with personnel trained to command, control, and/or communicate with one or more UAVs 102.1-102.N based upon a particular scenario or application. Trained personnel may utilize one or more computing devices implemented by central monitoring system 150 to dispatch one or more UAVs 102.1-102.N to an area surrounding an insured asset to collect data, receive data from one or more UAVs 102.1-102.N, make this data available for insurance-related purposes, etc.

One or more computing devices 160.1-160.M may be implemented as any suitable number and/or type of computing devices configured to facilitate insurance-related tasks using data collected from one or more UAVs 102.1-102.N. For example, one or more computing devices 160.1-160.M may be part of an insurance provider server(s), and as such may access insurance provider databases, algorithms, applications, remote servers, remote processors, etc., as needed to perform insurance-related functions using data collected from one or more UAVs 102.1-102.N. To provide another example, one or more computing devices 160.1-160.M may access weather data, access various private and/or municipal surveillance systems access various security monitoring systems, etc.

In various aspects, one or more UAVs 102.1-102.N, central monitoring system 150, one or more computing devices 160.1-160.M, and/or mobile computing device 190 may share one or more functions such that either of one or more UAVs 102.1-102.N, central monitoring system 150, one or more UAVs 102.1-102.N, and/or mobile computing device 190 may perform any portion (or all) of the functions otherwise performed by the other components. Furthermore, functions may be performed by one or more UAVs 102.1-102.N, central monitoring system 150, one or more computing devices 160.1-160.M, and/or mobile computing device 190 working in concert with one another.

For example, as will be further discussed herein, one or more UAVs 102.1-102.N may analyze collected drone data locally or transmit the drone data to central monitoring system 150 and/or one or more computing devices 160.1-160.M for further analysis, thereby offloading these tasks.

To provide additional examples, in some aspects, central monitoring system 150 and/or one or more computing devices 160.1-160.M may perform the same functions as one another in some aspects, while performing separate, dedicated functions in other aspects. That is, the command, control, and communication functions performed by central monitoring system 150 may be alternatively or additionally performed by one or more computing devices 160.1-160.M. Furthermore, the insurance-related functions performed by one or more computing devices 160.1-160.M may be alternatively or additionally performed by central monitoring system 150.

To provide yet another example, one or more of UAVs 102.1-102.N may function as a central monitoring system, performing command, control, and communication functions over other UAVs 102.1-102.N. These aspects may be particularly useful when one or more of UAVs 102.1-102.N is configured to navigate and communicate with one another in accordance with a swarm protocol.

II. Exemplary UAV or Drone

Figure 2:
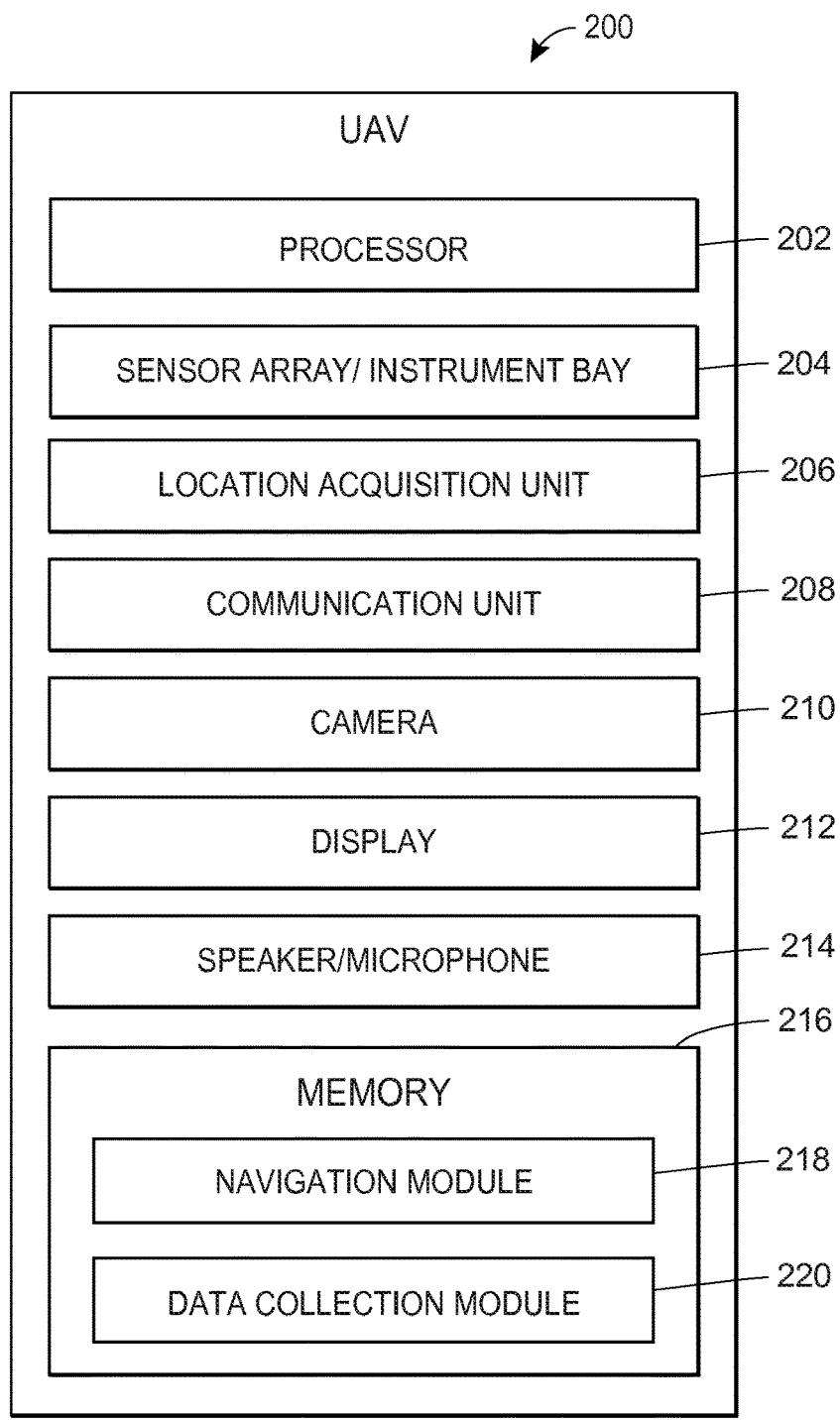
FIG. 2 illustrates an exemplary block diagram of a UAV 200 in accordance with an exemplary aspect of the present disclosure.

FIG. 2 illustrates an exemplary block diagram of a UAV 200. UAV 200 may include a processor 202, a sensor array and/or instrument bay 204, a location acquisition unit 206, a communication unit 208, a camera 210, a display 212, a speaker/microphone 214, and a memory 216. In one aspect, UAV 200 is an implementation of one of UAVs 102.1-102.N, as shown in FIG. 1. UAV 200 may include additional, fewer, or alternate components, including those discussed elsewhere herein.

Processor 202 may be implemented as any suitable type and/or number of processors, such as a host processor of UAV 200, for example. To provide additional examples, processor 202 may be implemented as an application specific integrated circuit (ASIC), an embedded processor, a central processing unit (CPU) associated with UAV 200, a graphical processing unit (GPU), etc.

Processor 202 may be configured to communicate with one or more of sensor array and/or instrument bay 204, location acquisition unit 206, communication unit 208, camera 210, display 212, speaker/microphone 214, and/or memory 216 via one or more wired and/or wireless interconnections, such as any suitable number of data and/or address buses, for example. These interconnections are not shown in FIG. 2 for purposes of brevity.

Processor 202 may be configured to operate in conjunction with one or more of sensor array and/or instrument bay 204, location acquisition unit 206, communication unit 208, camera 210, display 212, speaker/microphone 214, and/or memory 216 to process and/or analyze data, to store data to memory 216, to retrieve data from memory 216, to cause instructions, alerts and/or notifications to be displayed via display 212 and/or to be sounded via speaker/microphone 214, to receive, process, and/or interpret communications, commands, and/or controls received via communication unit 208, to receive, process, store, and/or interpret data measured and/or generated via sensor array and/or instrument bay 204, to receive, store, and/or transmit images and/or video captured via camera 210, to execute one or more functions related to the navigation of UAV 200, to receive data from and/or send data to one or more of central monitoring system 150, to another UAV (e.g., one or more of UAVs 102.1-102.N), to one or more of external computing devices 160.1-160.M, etc.

Sensor array and/or instrument bay 204 may be configured to collect/analyze information in accordance with any suitable number of implemented sensors, to store the collected information as drone data in any suitable portion of memory 216, and/or to transmit the drone data to one or more of central monitoring system 150, another UAV (e.g., one or more of UAVs 102.1-102.N), and/or one or more of external computing devices 160.1-160.M.

Sensor array and/or instrument bay 204 may be implemented as any suitable number and/or type of sensors configured to measure, monitor, and/or quantify one or more characteristics of UAV 200's environment as part of collected drone data.

Examples of suitable sensor types implemented by sensor array and/or instrument bay 204 may include one or more accelerometers, gyroscopes, compasses, speedometers, magnetometers, barometers, thermometers, proximity sensors, light sensors (e.g., light intensity detectors), Light Detection and Ranging (LiDAR) sensors, sonar sensors, electromagnetic radiation sensors (e.g., infrared and/or ultraviolet radiation sensors), ultrasonic and/or infrared range detectors, thermistors, humistors, hygrometers, altimeters, microphones, camera, video or audio recorders, etc. Sensor array and/or instrument bay 204 may additionally or alternatively include advanced sensors, for example, that detect and/or receive data associated with temperature measurements, thermal imaging, multispectral imaging, weather conditions, traffic conditions, etc.

Furthermore, sensor array and/or instrument bay 204 may be implemented as any suitable number and/or type of instruments configured to measure, monitor, and/or quantify one or more characteristics of UAV 200's environment as part of collected drone data. Examples of suitable instrument types implemented by sensor array and/or instrument bay 204 may include one or more soil sample extractors (e.g., coring tools), wood sample extractors, spectrometers, volumetric moisture content sensors, specialized biometric sensors, soil-testing equipment, specialized imaging equipment, etc.

Location acquisition unit 206 may be implemented as a satellite navigation receiver that works with a global navigation satellite system (GNSS) such as the global positioning system (GPS) primarily used in the United States, the GLONASS system primarily used in the Soviet Union, the BeiDou system primarily used in China, and/or the Galileo system primarily used in Europe.

Location acquisition unit 206 and/or processor 202 may be configured to receive navigational signals from one or more satellites and to calculate a geographic location of UAV 200 using these signals. Location acquisition unit 206 may include one or more processors, controllers, or other computing devices and memory to calculate the geographic location of UAV 200 without processor 202, or location acquisition unit 206 may utilize components of processor 202. Thus, processor 202 and location acquisition unit 206 may be combined or be separate or otherwise discrete elements.

Although aspects of UAV 200 may include a satellite navigation receiver, any suitable location-determining technology may be used. For example, communication unit 208 may determine the location of UAV 200 by receiving data from transmitter locations and then performing basic triangulation calculations to determine the relative position of UAV 200 with respect to the transmitting locations. For example, cellular towers or any customized transmitting radio frequency towers may be used instead of, or in addition to, satellites.

Communication unit 208 may be configured to support any suitable number and/or type of communication protocols to facilitate communications between UAV 200 and one or more other devices, such as one or more of central monitoring system 150, another UAV (e.g., one or more of UAVs 102.1-102.N), one or more of external computing devices 160.1-160.M, and/or mobile computing device 190, for example, as shown in FIG. 1. Communication unit 208 may be configured to send and receive data directly and/or indirectly (e.g., via communication network 170).

Communication unit 208 may be configured to receive any suitable type of information via one or more of central monitoring system 150, another UAV (e.g., one or more of UAVs 102.1-102.N), one or more of external computing devices 160.1-160.M, and/or mobile computing device 190. Furthermore, communication unit 208 may likewise be configured to transmit any suitable type of information to one or more of central monitoring system 150, another UAV (e.g., one or more of UAVs 102.1-102.N), one or more of external computing devices 160.1-160.M, and/or mobile computing device 190. Communication unit 208 may be implemented with any suitable combination of hardware and/or software to facilitate this functionality. For example, communication unit 208 may be implemented having any suitable number of wired and/or wireless transceivers, ports, connectors, antennas, etc.

Camera 210 may be configured to capture one or more digital images and/or video data, for example. In various aspects, camera 210 may include any suitable combination of hardware and/or software such as image sensors, optical stabilizers, image buffers, frame buffers, charge-coupled devices (CCDs), complementary metal oxide semiconductor (CMOS) devices, etc., to facilitate this functionality.

Camera 210 may be coupled to one or more servos that are controlled via processor 202 to obtain images and/or video from one or more locations, such as the area surrounding the insured asset accident 180, for example, as shown in FIG. 1. Camera 210 may include any suitable number of cameras, which may include cameras that capture image data in both the visible and the non-visible spectrum, such as digital and thermal imaging cameras, for example. Camera 210 may be configured to store image data to any suitable portion of memory 216.

Display 212 may be configured to display one or more images, messages, instructions, etc., in response to data received from processor 202. Display 212 may be implemented as any suitable type of display, and may facilitate user interaction with UAV 200. For example, display 212 may be implemented as a capacitive touch screen display, a resistive touch screen display, a standard display (a non-touch display), etc. In various aspects, display 212 may be configured to work in conjunction with processor 202 to detect user inputs upon a user selecting a displayed interactive icon or other graphic, to identify user selections of objects displayed via display 212, to display instructions and/or prompts to facilitate collecting information regarding an insured asset, etc. Additionally or alternatively, information displayed via display 212 may be in the form of audible announcements made via speaker/microphone 214.

In accordance with various aspects, memory 216 may be a computer-readable non-transitory storage device that may include any suitable combination of volatile memory (e.g., a random access memory (RAM) or non-volatile memory (e.g., battery-backed RAM, FLASH, etc.). Memory 216 may be configured to store instructions executable on processor 202, such as the various memory modules illustrated in FIG. 2 and further discussed below, for example. These instructions may include machine readable instructions that, when executed by processor 202, cause processor 202 to perform various acts as described herein.

Navigation module 218 is a region of memory 216 configured to store instructions that, when executed by processor 202, cause processor 202 to perform various acts in accordance with applicable aspects as described herein.

In one aspect, navigation module 218 may be a portion of memory 216 configured to store instructions, that when executed by processor 202, cause processor 202 to control the speed, direction, route, and/or altitude of UAV 200. For example, executable instructions stored in navigation module 218 may enable processor 202 to determine a destination specified as geographic location coordinates received as part of a command via communication unit 208, to determine a current geographic location of UAV 200 via location acquisition unit 206, and/or to execute the appropriate controls to maneuver UAV 200 to the destination.

To provide another example, navigation module 218 may be a portion of memory 216 configured to store instructions, that when executed by processor 202, cause processor 202 to issue a command to another UAV (e.g., one or more of UAVs 102.1-102.N), thereby causing that UAV to navigate to a particular geographic location.

In some embodiments, navigation of UAV 200 may be performed with the assistance of one or more persons controlling UAV 200. For example, personnel associated with central monitoring system 150 may use image and/or video captured by camera 210 as feedback and manually direct UAV 200. For example, a person may use a controller implemented by central monitoring system 150 that receives control inputs that are interpreted, translated, and transmitted as commands to UAV 200.

In other aspects, navigation may be performed by UAV 200 autonomously or with minimal assistance from one or more persons. For example, executable instructions stored in navigation module 218 may enable processor 202 to utilize image and/or video captured by camera 210 and to analyze the image and/or video in accordance with any suitable image recognition, object recognition, and/or machine vision algorithms. UAV 200 may use the outcome of such analyses to complete a requested task.

That is, in manually controlled aspects, UAV 200 may navigate to various locations when being controlled by a person via central monitoring system 150. However, in autonomous or semi-autonomous embodiments, UAV 200 may receive a command having a higher level structure, such as a command requesting UAV 200 to navigate to a particular distance from a home identified in the video (e.g., one that is selected via a user through an appropriate user input gesture), in which case UAV may carry out this task without further user assistance.

Data collection module 220 is a region of memory 216 configured to store instructions that, when executed by processor 202, cause processor 202 to perform various acts in accordance with applicable aspects as described herein. In one aspect, data collection module 220 may be a portion of memory 216 configured to store instructions, that when executed by processor 202, cause processor 202 to collect data associated with one or more locations in which UAV 200 is dispatched or otherwise directed. Similar to the navigation processes described above, UAV 200 may likewise perform data collection processes manually, autonomously, or semi-autonomously.

Regardless of how the data is collected, aspects include UAV 200 collecting drone data that is used to facilitate one or more insurance-related tasks and/or to assess the amount of risk associated with an insured asset. These insurance-related tasks and how the drone data is used for each of these tasks is further discussed below with reference to FIG. 4. The drone data may include, for example, any suitable data received via one or more of sensor array and/or instrument bay 204, location acquisition unit 206, and/or camera 210.

To provide an illustrative example, UAV 200 may be instructed to navigate to an area surrounding the insured asset 180 to collect audio and/or visual data, such as images, video, and/or sound recorded via camera 210 and/or sensor array and/or instrument bay 204. The images or videos may include any suitable content that may be used by an insurance provider for the various insurance-related tasks, as further discussed below. For example, the images, videos, or other sensor data may reveal fire hazards, flood risks, other potentially dangerous conditions, weather conditions, etc.

To provide another example, UAV 200 may collect soil and/or wood samples of the soil and/or trees surrounding a home. UAV 200 may analyze the samples to determine soil moisture content, and/or the presence of pests, as well as the age, number of dead sections, and degree of root damage for trees, etc. The analyzed samples may be stored as drone data in any suitable portion of memory 216, and/or transmitted one or more of central monitoring system 150, another UAV (e.g., one or more of UAVs 102.1-102.N), one or more of external computing devices 160.1-160.M, mobile computing device 190, etc.

III. Exemplary Mobile Computing Device

Figure 3:
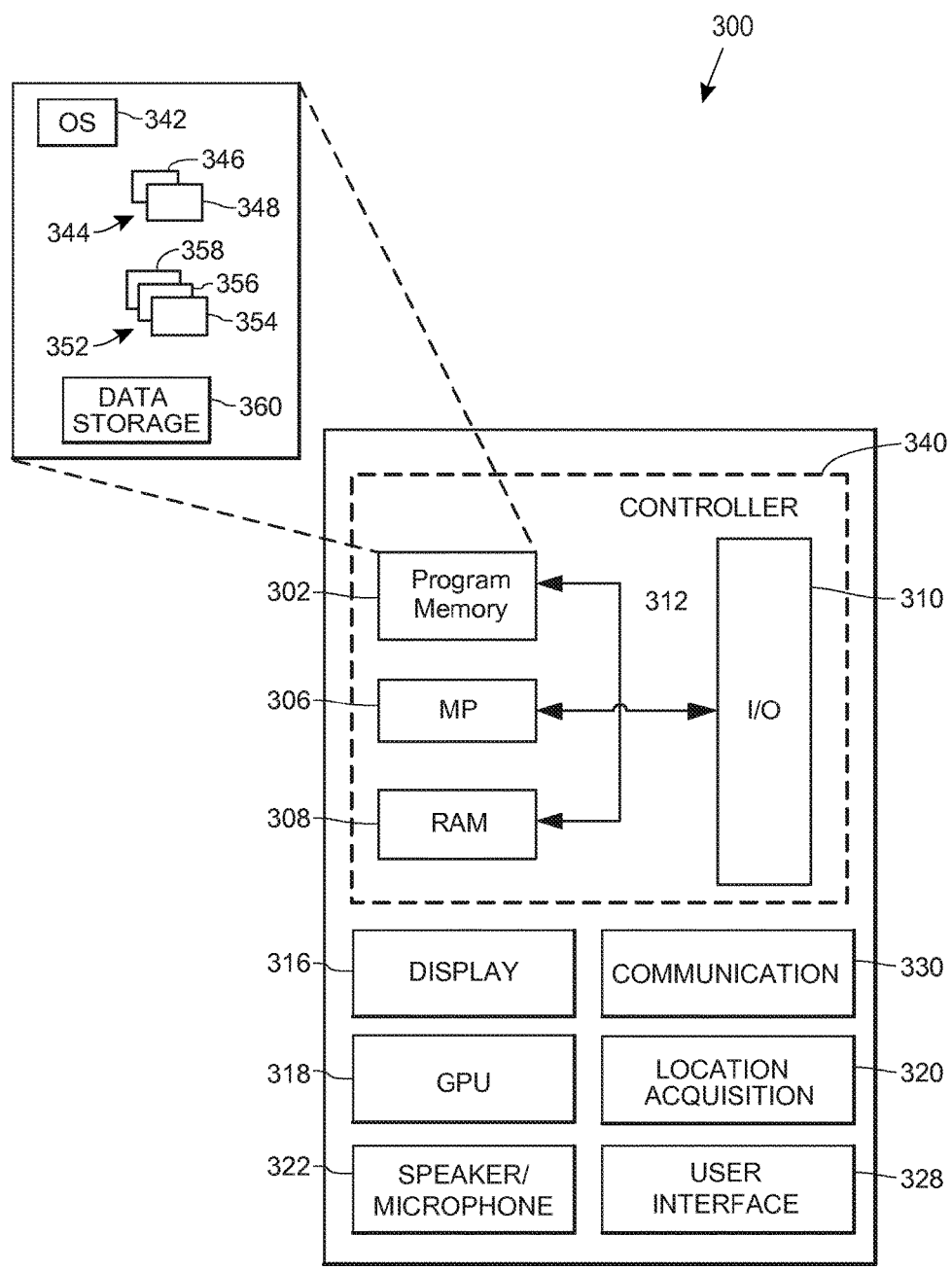
FIG. 3 illustrates an exemplary block diagram of a mobile computing device 300 in accordance with an exemplary aspect of the present disclosure.

FIG. 3 illustrates an exemplary block diagram of a mobile computing device 300. Mobile computing device 300 may be implemented as any suitable computing device. Mobile computing device 300 may be associated with a homeowner, vehicle owner, property owner or any other owner and/or policyholder of an insured asset and/or the mobile computing device 300 may be associated with an insurance representative. In one aspect, mobile computing device 300 may be an implementation of mobile computing device 190, as shown in FIG. 1.

Mobile computing device 300 may include a controller 340, a display 316, a graphics processing unit (GPU) 318, a location acquisition unit 320, a speaker/microphone 322, a user interface 328, and a communication unit 330. Mobile computing device 300 may include additional, fewer, or alternate components, including those discussed elsewhere herein.

Controller 340 may include a program memory 302, a microprocessor (MP) 306, a random-access memory (RAM) 308, and an input/output (I/O) interface 310, each of which may be interconnected via an address/data bus 312. Controller 340 may be implemented with any suitable type and/or number of processors, such as a host processor of mobile computing device 300, for example. In some aspects, controller 340 may be configured to communicate with additional data storage mechanisms not shown in FIG. 3 for purposes of brevity (e.g., one or more hard disk drives, optical storage drives, solid state storage devices, etc.) that may reside within and/or are otherwise associated with mobile computing device 300.

Program memory 302 may store data used in conjunction with one or more functions performed by mobile computing device 300 to facilitate the interaction between mobile computing device 300 and one or more other devices (e.g., one or more of central monitoring system 150, one or more of UAVs 102.1-102.N, and/or one or more of external computing devices 160.1-160.M). For example, program memory 302 may store one or more programs, applications, algorithms, etc. that, when executed by controller 340, facilitate the interaction between mobile computing device 300 and one or more networks (e.g., communication network 170).

In various aspects, program memory 302 may be implemented as a non-transitory tangible computer readable media configured to store computer-readable instructions that, when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs 306 may be configured to execute one or more of software applications 344, software routines 352 residing in program memory 302, and/or other suitable software applications. For example, operating system 342 may be implemented as any suitable operating system platform depending upon the particular implementation of mobile computing device 300. Operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one aspect, data storage 360 may store data such as application data for the one or more software applications 344, routine data for the one or more software routines 352, user login credentials, received insurance-related information, received insurance policy data, etc.

Display 316 may be implemented as any suitable type of display and may facilitate user interaction with mobile computing device 300 in conjunction with user interface 328. For example, display 316 may be implemented as a capacitive touch screen display, a resistive touch screen display, etc. In various aspects, display 316 may be configured to work in conjunction with controller 340 and/or GPU 318 to display one or more fields for user input, to display insurance pricing such as premium quotes, adjustments to insurance premiums, etc.

Location acquisition unit 320 may be configured to generate geographic location data utilizing any suitable global positioning techniques. For example, location acquisition unit 320 may communicate with one or more satellites and/or wireless transmitters to determine a location of mobile computing device 300. Location acquisition unit 320 may function independently or in conjunction with one or more components of mobile computing device 300. For example, location acquisition unit 320 may work in conjunction with communication unit 330 to utilize cellular location data received via communications unit 330 and implement "Assisted Global Positioning System" (A-GPS). To provide additional examples, location acquisition unit 318 may work as an independent unit implementing satellite GPS, or any other suitable global positioning protocol (e.g., the GLONASS system operated by the Russian government, the Galileo system operated by the European Union, etc.) to determine a geographic location of mobile computing device 300.

Communication unit 330 may be configured to facilitate communications between mobile computing device 300 and one or more other devices, such as central monitoring system 150, one or more of UAVs 102.1-102.N, one or more of external computing devices 160.1-160.M, etc. In various aspects, mobile computing device 300 may be configured to communicate with these other devices in accordance with any suitable number and/or type of communication protocols. Thus, in various aspects, communication unit 330 may be implemented with suitable hardware, firmware, and/or software to support any suitable number and type of communication protocols in accordance with the various aspects described herein.

Communication unit 330 may be configured to support separate or concurrent communications, which may be the same type of communication protocol or different types of communication protocols. For example, communication unit 330 may be configured to facilitate communications between mobile computing device 300 and one or more backend components (e.g., one or more of central monitoring system 150, and/or external computing devices 160.1-160.M) via a cellular communications protocol while facilitating communications between mobile computing device 300 and one or more UAVs 102.1-102.N via a personal area network communications protocol, a Wi-Fi protocol (e.g., Wi-Fi direct), etc.

Speaker/microphone 322 may be configured as one or more devices. Speaker/microphone 322 may include a microphone configured to detect sounds and to convert detected sounds to data suitable for voice recognition analysis, for storage in data storage 360, for communications via communications unit 330, etc. Speaker/microphone 322 may additionally or alternatively include a speaker configured to play sounds in response to data received from one or more components of mobile computing device 300 (e.g., controller 340 and/or communication unit 330).

User interface 328 may be implemented as any suitable device configured to collect user input, such as a "soft" keyboard displayed on display 316, a keyboard attached to mobile computing device 300, an external keyboard communicating via a wired or a wireless connection (e.g., a BLUETOOTH keyboard), an external mouse, etc.

In one aspect, software applications 344 may include an insurance policy renewal application 346, which may be implemented as a series of machine-readable instructions for executing one or more functions described herein. In another aspect, insurance policy renewal application 346 may cooperate with one or more other hardware or software components of mobile computing device 300 to perform these functions.

For example, insurance policy renewal application 346 may include various instructions for facilitating, reporting, or otherwise communicating information to an insurance provider, which may be used by the insurance provider for various insurance-related purposes and are further discussed below with reference to FIG. 4. In one aspect, when launching insurance policy renewal application 346, a user may enter login credentials which may be verified by one or more external computing devices, servers, etc. (e.g., one or more of external computing devices 160.1-160.M). These login credentials may be associated with insurance provider profile data, such as insurance policy numbers, vehicles insured, homes insured, vehicle identification numbers of insured vehicles, contact information, premium rates, discounts, etc. In this way, communications from mobile computing device 300 allow central monitoring system 150 and/or one or more of external computing devices 160.1-160.M to uniquely identify the customer so that any collected data, via mobile computing device 300 and/or via one or more UAVs 102.1-102.N, may be saved and later referenced to the customer and any insurance policies associated with that customer.

In some aspects, insurance policy renewal application 346 may facilitate communications with one or more of central monitoring system 150, one or more of UAVs 102.1-102.N, and/or one or more of external computing devices 160.1-160.M, which may be relayed to a user using any suitable techniques (e.g., via display 316). For example, insurance policy renewal application 346 may facilitate a user receiving a recommendation from central monitoring system 150 and/or one or more of external computing devices 160.1-160.M on how to reduce a risk to the insured asset. Insurance policy renewal application 346 may also facilitate a user transmitting a reply to central monitoring system 150 and/or external computing devices 160.1-160.M indicating the user's intent to comply with the provided recommendation.

For example, the recommendation may include a request to remove and/or enclose a newly added swimming pool to the user's insured home. The user may indicate that she will remove the swimming pool, that she will place a fence around the swimming pool, and/or that she will not modify the swimming pool. If the user indicates that she will not modify the swimming pool, insurance policy renewal application 346 may facilitate a user receiving an updated insurance policy having one or several increased insurance premiums which may take effect upon renewal of the insurance policy. Additionally, insurance policy renewal application 346 may facilitate a user receiving an updated insurance policy having coverage limitations, changes in deductibles, or exclusions, or insurance policy renewal application 246 may facilitate a user receiving an indication that the insurance policy has been cancelled or non-renewed. On the other hand, if the user indicates she will remove the swimming pool or place a fence around it, insurance policy renewal application 346 may facilitate a user receiving an updated insurance policy, after drone data is collected for the insured asset, at a later date to ensure that the swimming pool has been or is being removed or that a fence has been or is being installed. In another example, the recommendation may include a request to remove an on-site day care or other home business, such as an auto repair business at the user's insured home. If the user indicates that she will not remove the business, insurance policy renewal application 346 may facilitate the user receiving an indication that the insurance policy has been cancelled or non-renewed.

In yet another example, insurance policy renewal application 346 may facilitate a user transmitting an indication to central monitoring system 150 and/or one or more of external computing devices 160.1-160.M of whether she accepts or declines the renewed insurance policy including the updated insurance premiums.

Software applications 344 may include a web browser 348. In some aspects, web browser 348 may be a native web browser application, such as Apple's Safari®, Google Android™ mobile web browser, Microsoft Internet Explorer® for Mobile, Opera Mobile™, etc. In other embodiments, web browser 348 may be implemented as an embedded web browser. Regardless of the implementation of web browser 348, various aspects include web browser 348 being implemented as a series of machine-readable instructions for interpreting and displaying web page information received from one or more backend components. This web page information may be utilized in conjunction with insurance policy renewal application 346 to perform one or more function of the aspects as described herein.

In one embodiment, software routines 352 may include a recommendation routine 354, a suggested service provider routine 356, and/or an updated insurance policy agreement routine 358. Recommendation routine 354 may include instructions, that when executed by controller 340, display a recommendation to the policyholder on how to reduce a risk to the insured asset.

The recommendation may also include a predetermined amount of time for the policyholder to reduce the amount of risk without an adjustment to the insurance policy upon renewal (e.g., a week, a month, two months, a year, by the renewal date, etc.). In some embodiments, the recommendation may further include minimum requirements that the policyholder must meet within the predetermined amount of time to avoid an adjustment to, cancellation of, or non-renewal of the insurance policy upon renewal.

For example, if the recommendation includes a several step process to reduce the risk, the recommendation may specify that at least a predetermined number of the steps must be completed by the predetermined amount of time to avoid an adjustment to, cancellation of, or non-renewal of the insurance policy. In another example, the policyholder may be required to reduce the risk by a threshold amount (e.g., 10 percent, 20 percent, 50 percent, etc.) within the predetermined amount of time to avoid an adjustment to, cancellation of, or non-renewal of the insurance policy. In yet another example, the recommendation may specify that a required course of action must begin by the predetermined amount of time to avoid an adjustment to, cancellation of, or non-renewal of the insurance policy. In particular, if the required course of action is to clear a specific distance or area around the insured risk of organic material (e.g., vegetation, shrubbery, and/or trees), the process must begin by the predetermined amount of time to avoid an adjustment, cancellation, or non-renewal.

In any event, recommendation routine 354 may include instructions, that when executed by controller 340, transmit an indication, via communication unit 330 to one or more external computing devices 160.1-160.M, of whether the policyholder intends to comply with the provided recommendation. If the policyholder transmits an indication that she intends to comply, suggested service provider routine 356 may include instructions, that when executed by controller 340, display indications of suggested service providers for carrying out the provided recommendation. For example, if the provided recommendation is to repair/remove damaged trees, suggested service provider routine 356 may display indications of Joe's Tree Repairs, Jenny's Tree Removal Service, etc. In some embodiments, when the user selects one of the indications, suggested service provider routine 356 may facilitate communication between the policyholder and the suggested service provider to, for example, schedule the repair/removal of the damaged trees.

Updated insurance policy agreement routine 358 may include instructions, that when executed by controller 340, display a renewed insurance policy including updated insurance premiums. For example, updated insurance policy agreement routine 358 may display the renewed insurance policy when the policyholder indicates he does not intend to comply with the provided recommendation and/or after second drone data is captured on and/or after the predetermined amount of time to determine whether the policyholder complies with the provided recommendation. In some embodiments, the insurance provider may decline to offer (non-renew) the insurance policy for example, when the amount of risk to the insured asset is above a predetermined threshold, and/or the policyholder does not comply or intend to comply with the provided recommendation. Accordingly, updated insurance policy agreement routine 358 may display an indication that the insurance policy has been cancelled or non-renewed. On the other hand, when a renewed insurance policy is displayed, updated insurance policy agreement routine 358 may also include instructions, that when executed by controller 340, transmit an indication, via communication unit 330 to one or more external computing devices 160.1-160.M of whether the policyholder accepts or declines the renewed insurance policy.

Although each of the components in FIG. 3 are illustrated as separate units or modules, any components integrated as part of mobile computing device 300 may be combined and/or share functions. For example, controller 340, GPU 318, and program memory 302 may be integrated as a single processing unit. Furthermore, although connections are not shown between the individual components of mobile computing device 300, mobile computing device 300 may implement any suitable number of wired and/or wireless links to facilitate communication and interoperability between these components.

For example, program memory 302, communication unit 330, and/or display 316 may be coupled via wired buses and/or wireless links to controller 340 and/or GPU 318 to facilitate communications between these components and/or to enable these components to accomplish their respective functions as described throughout the present disclosure. Furthermore, although FIG. 3 illustrates mobile computing device 300 having a single program memory 302, mobile computing device 300 may implement any suitable number and/or combination of memory systems.

Additionally, although FIG. 3 depicts controller 340 as including one program memory 302, one MP 306, and one RAM 308, controller 340 may include any suitable number of these components. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

IV. Exemplary External Computing Device

Figure 4:
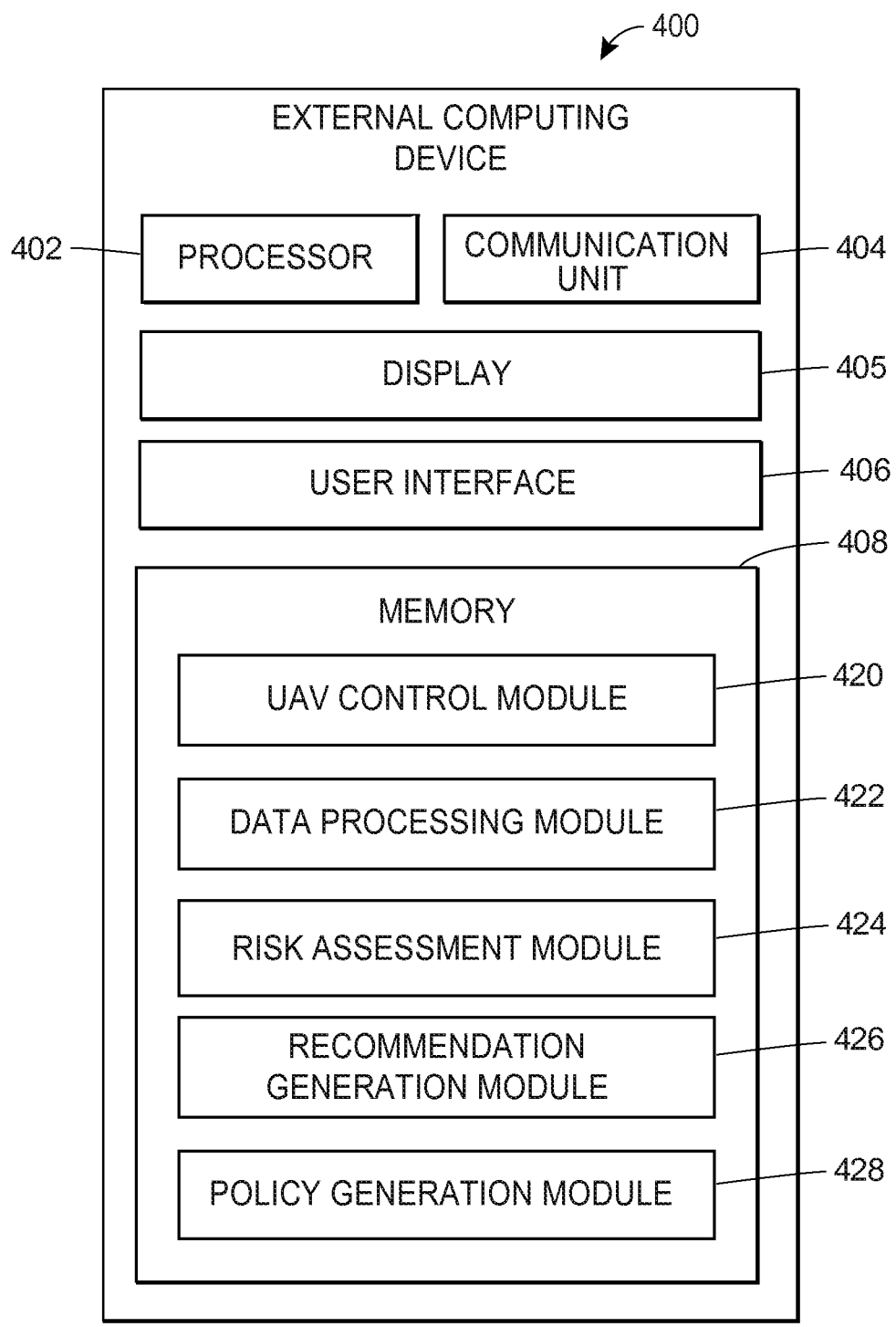
FIG. 4 illustrates an exemplary block diagram of an external computing device 400 in accordance with an exemplary aspect of the present disclosure.

FIG. 4 illustrates an exemplary block diagram of an external computing device 400. In various aspects, external computing device 400 may be an implementation of central monitoring system 150 or one or more of external computing devices 160.1-160.M, as shown in FIG. 1. External computing device 400 may include a processor 402, a communication unit 404, a display 405, a user interface 406, and a memory 408. External computing device 400 may include additional, fewer, or alternate components, including those discussed elsewhere herein.

Processor 402 may be implemented as any suitable type and/or number of processors, such as a host processor of external computing device 400, for example. To provide additional examples, processor 402 may be implemented as an application specific integrated circuit (ASIC), an embedded processor, a central processing unit (CPU) associated with external computing device 400, a graphical processing unit (GPU), etc.

Processor 402 may be configured to communicate with one or more of communication unit 404, display 405, user interface 406, and/or memory 408 via one or more wired and/or wireless interconnections, such as any suitable number of data and/or address buses, for example. These interconnections are not shown in FIG. 4 for purposes of brevity.

Processor 402 may be configured to operate in conjunction with one or more of communication unit 404, display 405, user interface 406, and/or memory 408 to process and/or analyze data, to store data to memory 408, to retrieve data from memory 408, and/or to perform one or more insurance-related functions. For example, processor 402 and communication unit 404 may facilitate receiving data from and/or sending data to one or more devices, such as central monitoring system 150, mobile computing device 200, one or more UAVs 102.1-102.N, etc.

Communication unit 404 may be configured to facilitate communications between external computing device 400 and one or more other devices. For example, in aspects in which external computing device 400 is an implementation of one or more of external computing devices 160.1-160.M, as shown in FIG. 1, communication unit 404 may facilitate communications between external computing device 400 and one or more UAVs 102.1-102.N, mobile computing device 190, and/or central monitoring system 150.

In various aspects, external computing device 400 may be configured to communicate with these other devices in accordance with any suitable number and type of communication protocols. Thus, in various aspects, communication unit 404 may be implemented with suitable hardware, firmware, and/or software to support any suitable number and type of communication protocols in accordance with the various aspects described herein.

Display 405 may be implemented as any suitable type of display and may facilitate user interaction with external computing device 400 in conjunction with user interface 406. For example, display 405 may be implemented as a capacitive touch screen display, a resistive touch screen display, etc. In various aspects, display 405 may be configured to work in conjunction with processor 402 and/or user interface 406 to display drone data received from one or more UAVs, to display data received from one or more mobile computing devices (e.g., an indication accepting the renewed insurance policy), to display the result of various insurance-related calculations, to display the location of one or more UAVs, to display insurance profile data and/or other information associated with a policyholder, to provide a graphical user interface (GUI) to facilitate the control and/or monitoring of one or more UAVs, etc.

User-interface 406 may be implemented as any suitable device configured to collect user input, such as a "soft" keyboard displayed on display 405, a keyboard attached to external computing device 400, an external keyboard communicating via a wired or a wireless connection (e.g., a BLUETOOTH keyboard), specialized joystick controls configured to control one or more UAVs, an external mouse, etc.

In various aspects, memory 408 may be implemented as a non-transitory tangible computer readable media configured to store computer-readable instructions, that when executed by processor 402, cause processor 402 to perform various acts. Program memory 408 may store one or more modules, which may be executed by processor 402 in conjunction with one or more other hardware or software components of external computing device 400 to facilitate the execution of one or more functions related to the various aspects, as further discussed below.

UAV control module 420 may include instructions to facilitate monitoring and/or controlling of one or more UAVs, such as UAVs 102.1-102.N, for example, as shown in FIG. 1. UAV control module may include instructions that, when executed by processor 402, enables processor 402 to process data sent by one or more UAVs, to identify one or more UAVs, to determine a status of one or more UAVs, and/or to transmit commands to one or more UAVs.

For example, processor 402 may receive periodic transmissions sent by one or more UAVs, and these transmissions may include a unique UAV identifier, a current geographic location of each UAV, a UAV status (e.g., en route to location, collecting data, charging and/or refueling, etc.), and/or a confirmation of receipt of a command sent to one or more UAVs. In some aspects, processor 402 may use this information to command one or more UAVs to navigate to a specific geographic location or to return to a predetermined "base" location, which may be used for refueling, recharging, and/or maintenance, for example.

In some aspects, a user may interact with external computing device 400 to perform control over one or more UAVs by, for example, watching video data and/or geographic location data received from one or more UAVs shown on display 405 and sending commands to one or more UAVs using this feedback. Information shown on display 405 for UAV control may include, for example, live video data, a map overlaid onto the UAV's current geographic location, etc.

In accordance with such aspects, processor 402 may execute instructions stored in UAV 402 to process controls received via user interface 406 (e.g., adjustments to altitude, speed, yaw, pitch, roll, direction, etc.), and convert these controls to data that is sent in a UAV control transmission, which may be transmitted via communication unit 404, for example.

When controlled by a user, external computing device 400 may function as a UAV dispatching center, receiving instructions to dispatch one or more UAVs and then navigating the one or more UAVs to the requested geographic locations, which may include an area surrounding the insured asset. For example, personnel trained to control UAVs may monitor communications received via communication unit 404, which may be forwarded from a call center, received as a request sent via a mobile computing device, etc.

In other aspects, one or more UAVs may be controlled without (or with minimal) user intervention. In accordance with such aspects, external computing device 400 may function as a UAV dispatching center, but a person may not need to manually control one or more UAVs. For example, UAV requests may be received by external computing device 400 in an automated fashion, such as requests sent via a mobile computing device or via another Internet-enabled device, for example. In accordance with such aspects, these requests may include the geographic location of a requested UAV destination and/or details regarding the type of data to be collected upon the UAV reaching the destination.

In accordance with such aspects, processor 402 may execute instructions stored in UAV control module 420 to process these requests, determine a navigation route for one or more UAVs, and transmit the appropriate commands to one or more UAVs to ensure the UAV arrives at the requested geographic location. In various aspects, processor 402 may utilize live video data received from a UAV, weather conditions, and/or any other suitable data to safely guide the UAV to the requested location.

For example, processor 402 may execute instructions stored in UAV control module 420 to analyze live video data received from a UAV in accordance with any suitable image recognition, object recognition, and/or machine vision algorithms to guide the UAV to a specific geographic location with little or no user intervention. In some aspects, the one or more UAVs may store collected drone data in a rolling buffer, periodically transmit collected drone data to an external computing device, etc.

Regardless of how external computing device 400 controls one or more UAVs, aspects include processor 402 executing instructions stored in UAV control module 420 to send one or more commands to one or more UAVs which, upon receiving by the commands, execute them to collect various types of data. For example, processor 402 may execute instructions stored in UAV 402 to send data in a UAV control transmission, which may be transmitted via communication unit 404, for example. This data may indicate specific commands which may be manually sent by a user and/or automatically sent upon a particular condition being satisfied, for example (e.g., the UAV arriving within a threshold distance of the destination).

The data collection commands may include any suitable command for the collection of drone data, such as recording audio and/or video of the insured asset, recording audio and/or video of an area surrounding the insured asset, such as within a 100 yard radius, requesting the weather conditions at the insured asset, requesting the temperature of the insured asset, requesting soil and wood samples of soil and/or trees surrounding the potentially insured asset, requesting an analysis of the type and/or amount of chemicals present at the insured asset, etc.

Data processing module 422 may include instructions to facilitate the collection of drone data from one or more UAVs, such as UAVs 102.1-102.N, for example, as shown in FIG. 1. Additionally or alternatively, data processing module 422 may include instructions to facilitate the collection of other sources of data, such as data received via one or more mobile computing devices, for example.

Data processing module 422 may include instructions that, when executed by processor 402, enable processor 402 to process drone data sent by one or more UAVs, to store the drone data in memory 408 and/or another suitable storage device (e.g., one or more databases in which external computing device 400 is connected), and/or to transmit the drone data to one or more other external computing devices.

For example, once a UAV is dispatched to an area surrounding an insured asset, the UAV may proceed to collect drone data, as previously discussed above with reference to the instructions stored in UAV control module 420. In various aspects, processor 402 may execute instructions stored in data processing module 422 to receive this data from the one or more UAVs, to parse the data, and/or to correlate the data so that specific drone data may be later identified and associated with the particular type of data to which it corresponds.

To provide an illustrative example, processor 402 may execute instructions stored in data processing module 422 to receive live video and/or audio data recorded by a UAV, which may include various types of information used to assess the amount of risk present in an insured asset. In one aspect, this video may be time stamped by the UAV and/or by external computing device 400 to indicate when each command was sent and/or when each different type of data was recorded. Data processing module 422 may determine the proximity of objects included in the video, still image, or via other sensor data (e.g., LiDAR) to the insured asset (e.g., trees, fire hydrants, swimming pools, etc.).

In this way, external computing device 400 may receive the data, parse the data, reference the timestamps to the commands sent, and label and/or store the parsed collected drone data in a way such that it may be easily identified/filtered. For example, drone data may include video, still images, or other sensor data for the insured asset taken at several different times (e.g., when a homeowner initially purchases homeowners' insurance and also upon each subsequent renewal of the homeowners' insurance policy) and locations (e.g., from above the home, behind the home, in front of the home, 200 feet north of the home).

In another example, drone data may include video, still images, or other sensor data for trees and/or other objects which are not in close proximity to an insured home (e.g. more than 100 yards, more than 200 yards, more than 300 yards, etc.). As a result, the drone data may not be relevant to assessing risk and may be filtered out. Aspects include processor 402 executing instructions stored in data processing module 422 to separate these videos, still images, and/or other sensor data and store them with a suitable header, filename, label, etc., so that this data can be easily identified, accessed, read, viewed, processed, etc.

In yet another example, data processing module 422 may perform image processing of image, video, and/or other sensor data recorded by the UAV to identify various objects within the image and/or video, such as a fence surrounding a home, trees, a garage, a fire hydrant, a swimming pool, a roof of the home, a security system, etc. Various image processing techniques such as edge detection may be used by the data processing module to identify the objects.

Risk assessment module 424 may include instructions to facilitate the determination of an amount of risk associated with insuring the asset using data collected from one or more UAVs, such as UAVs 102.1-102.N, for example, as shown in FIG. 1. Risk assessment module 424 may include instructions that, when executed by processor 402, enable processor 402 to assess risk in accordance with any suitable number and type of risk assessment algorithms, calculations, manual review, etc., to compare the assessed risk to previously assessed risk data from an initial underwriting process and/or a most recent re-underwriting process to determine whether there is an increased, decreased, or same amount of risk from the previous assessment, to store risk assessment data indicative of the risk assessment determination in memory 408 and/or another suitable storage device (e.g., one or more databases in which external computing device 400 is connected), and/or to transmit the risk assessment data to one or more other external computing devices.

In one aspect, risk assessment module 424 may compare images of the insured asset and/or an area surrounding the insured asset to previously stored images of the insured asset which were captured during the initial underwriting process for the insured asset and/or a most recent re-underwriting process. Additionally, risk assessment module 424 may compare soil and/or wood samples of an area surrounding the insured asset to previously stored soil and/or wood samples of the area surrounding the insured asset, may compare weather conditions for the location corresponding to the insured asset to previously stored weather conditions, may compare thermal signatures for the insured asset to previously stored thermal signatures, and/or may compare any other suitable drone data collected within an area surrounding the insured asset to previously stored drone data.

For example, risk assessment module 424 may compare images of an insured home to previously stored images of the insured home to determine that a new addition to the home has been added, such as a garage, a guest house, a swimming pool, etc. Processor 402 may then execute instructions stored in risk assessment module 424 to determine an amount of risk associated with the new addition, for example, based upon the size of the new addition, hazards associated with the new addition (e.g., the dangers associated with a swimming pool), the value of the new addition, etc.

In another example, risk assessment module 424 may compare images of an insured home to previously stored images of the insured home to determine that the condition of the insured home and/or a portion of the insured home has declined, such as a roof, siding, windows, doors, foundation, etc. If the condition has declined by more than a predetermined threshold amount (e.g. from good to fair), risk assessment module 424 may determine an increased amount of risk associated with the condition of the insured home.

In yet another example, risk assessment module 424 may compare images of an area surrounding an insured home to previously stored images of the area to determine that the amount of trees, shrubbery, vegetation (e.g., grass, flowers, weeds), and/or other organic materials (e.g., dead leaves, pine needles) surrounding the insured home has increased. Risk assessment module 424 may also determine that the trees, shrubbery, vegetation (e.g., grass, flowers, weeds), and/or other organic materials (e.g., dead leaves, pine needles) have grown, such that they are within a predetermined distance (e.g., 10 feet, 30 feet, 50 feet, etc.) of the insured home. A risk of fire (e.g., wildfire) for the insured home may be determined based upon the increased amount of trees and/or other vegetation and/or based upon the growth of the trees and/or other vegetation. In some embodiments, the drone data may include a spectral analysis of the area surrounding the insured home via the spectrometers. Based upon the spectral analysis, risk assessment module 424 may determine the type of trees, shrubbery, vegetation, and or other organic materials which may be used to determine the risk of fire. For example, *eucalyptus* trees may pose a higher risk of wildfire than sycamore trees.

In another example, risk assessment module 424 may compare soil and wood samples of trees surrounding an insured home to previously stored soil and wood samples for the trees to identify damage to the trees. Damage to the trees may be identified for example, based upon a number and/or size of dead sections of the trees, a degree of root damage for the trees, a number of dead branches, an age of the trees, etc. A risk of the trees falling on the insured home may be determined based upon the identified damage.

In yet another example, risk assessment module 424 may compare soil samples of an area surrounding the insured home to previously stored soil samples for the surface to identify changes in the moisture content in the soil. If the moisture content has changed by more than a threshold amount, risk assessment module 424 may determine a risk of sewer and/or drain backup or a flood risk. Additionally, risk assessment module 424 may determine a risk of landslides based on the soil moisture content. Furthermore, if the soil moisture content is very low (e.g., below a threshold amount), for example from a prolonged drought, risk assessment module 424 may determine a risk of structural damage to the foundation.

For instance, in areas where soil moisture content is elevated, there may be an increased risk of lower levels of structures becoming inundated by ground water. This ground water conventionally may be removed through the use of sump pumps and other dewatering systems. Locations with saturated soils are at risk when sump pumps are undersized for the flow, are impaired (lack of power or broken), or are absent. In these cases drone observation of soil water content may alert a property owner of an imminent threat of sewer/drain backup (and maybe flash flood). Additionally, slope stability may become a problem. Saturated soil does not stay on hillsides, and thus there may be a risk of land movement/landslides (particularly when coupled with past wildfire activity).

In locations where there a deficit of soil moisture, (e.g. prolonged drought) conditions, or cyclic wetting and drying conditions, the soil in and around the insured location may shrink, providing insufficient stability for the imposed foundation loads (e.g. expansive clay soils, evaporate soils, permafrost). Drought conditions may also lead to large trees drawing moisture from the soils below foundations. Dead and dying trees may result in voids in the soil as the root deteriorate and also result in foundation failures. Risk assessment module 424 may analyze the drone data to determine, inter alia, whether soil moisture content is elevated or deficit, the extent that the soil moisture content is elevated or deficit (or otherwise varying from normal), and/or risks presented or potentially presented to insured assets by the abnormal amount or level of soil moisture content.

In yet another example, risk assessment module 424 may compare weather conditions at the location corresponding to an insured home to previously stored weather conditions. If the weather conditions have changed such that there is a risk of a natural disaster at the location corresponding to the insured home (e.g., tornadoes, earthquakes, wildfires, volcanoes, floods, hurricanes, severe thunderstorms, tsunamis, etc.), risk assessment module 424 may determine a risk of natural disasters based upon the change in weather conditions. Moreover, if the weather/climate conditions have changed such that an ocean, lake, river, stream, beach, and/or other body of water is within a predetermined distance of the insured home, risk assessment module 424 may determine a flood risk based upon the change in weather/climate conditions.

In another example, risk assessment module 424 may compare height data for an insured home to previously stored height data for the insured home after a storm, such as a rain and/or snow storm. For example, if a snow storm causes the roof to be covered in six feet of snow, the roof top surface may have an elevation that is six feet higher when compared to the previously stored height data for the roof, for example as detected by LiDAR sensors. Accordingly, risk assessment module 424 may determine a risk of the roof collapsing based upon the change in elevation which may be mitigated by removing part or all of the snow.

In yet another example, risk assessment module 424 may compare images of an area surrounding an insured home to previously stored images of the area to determine that a backup generator has been added or removed. If the backup generator has been removed when compared to previously stored images of the area, risk assessment module 424 may determine a risk of frozen water pipes, basement flooding, or fire (e.g., from candles, kerosene lamps, or unapproved temporary heat sources such as space heaters) based upon the removal of the backup generator. On the other hand, if the backup generator has been added when compared to previously stored images of the area, risk assessment module 424 may determine a decreased risk of frozen water pipes, basement flooding, or fire based upon the addition of the backup generator which may lead to discounted insurance premiums for the policyholder.

In any event, the recommendation generation module 426 may include instructions, that when executed by processor 402, enable processor 402 to receive the type of risk (e.g., risk of fire) and/or the cause of the risk (e.g., additional gas grills at the insured home) from the risk assessment module 424. The recommendation generation module 426 may also include instructions, that when executed by processor 402, enable processor 402 to generate and/or provide a recommendation on how to reduce the amount of risk to the policyholder's mobile computing device, such as the mobile computing device 300 as shown in FIG. 3.

The recommendation may be generated based upon the type of risk to the insured asset and/or the cause of the risk. For example, if risk assessment module 424 determines a risk of trees falling based upon two damaged trees, the recommendation may be to repair or remove the two damaged trees. In another example, if risk assessment module 424 determines a risk of liability based upon a new swimming pool, the recommendation may be to remove or enclose the swimming pool. In yet another example, if risk assessment module 424 determines a risk of property damage based upon a roof of the insured home being in poor condition, the recommendation may be to repair and/or replace the roof.

In some embodiments, the recommendation may include multiple corrective actions for the policyholder to take and/or the recommendation may include a multi-step process. For example, risk assessment module 424 may determine a risk of fire based upon changed weather conditions at the location of the insured home and based upon an increased number of trees and/or vegetation surrounding the insured home. As a result, the recommendation may include a first step and/or corrective action to remove at least some of the trees and/or vegetation. The recommendation may also include a second step and/or corrective action to replace the roof, windows, and/or siding with fire-resistant materials.

Moreover, the recommendation may include indications of service providers for carrying out the recommendation. For example, if the recommendation is to install sump pumps to reduce a risk of sewer and/or drain backup, the recommendation may include indications of several service providers for installing sump pumps and/or contact information for scheduling the installation. Additionally, the recommendation may include a predetermined amount of time for the policyholder to reduce the amount of risk without an adjustment to the insurance policy upon renewal (e.g., a week, a month, two months, a year, by the renewal date, etc.). In some embodiments, the recommendation may also include minimum requirements for the policyholder to complete within the predetermined amount of time to avoid an adjustment to, cancellation of, or non-renewal of the insurance policy upon renewal.

For example, if the recommendation includes multiple corrective actions as described above, the minimum requirement may be to complete at least a predetermined number (e.g., one) of the corrective actions. In another example, the minimum requirement may be to reduce the risk by a threshold amount (e.g., 50 percent), by for example, removing or trimming half of the overgrown trees which present a fire risk to an insured home. In yet another example, the minimum requirement may be to begin carrying out the recommendation within the predetermined amount of time, such as by scheduling a tree removal service to begin the tree removal process on a date that is within the predetermined amount of time.

In some embodiments, the recommendation may include a request to the policyholder to allow the UAVs to inspect the interior of the insured asset to determine whether the policyholder completed the minimum requirements. For example, to determine whether the policyholder installed a minimum number of fire sprinklers or fire extinguishers in a warehouse, the UAVs may capture images of the interior of the warehouse which may be analyzed to identify the number of fire sprinklers or fire extinguishers installed or being installed in the warehouse. In turn, the policyholder may provide a response to the external computing device indicating that she accepts or declines the request.

Recommendation generation module 426 may also include instructions, that when executed by processor 402, enable processor 402 to receive an indication of whether the policyholder intends to carry out the recommendation from the policyholder's mobile computing device. When the policyholder intends to carry out the recommendation, the recommendation generation module 426 may include instructions to facilitate communication with the UAV control module 420 for the UAV control module to collect second drone data at a second date which may correspond to the predetermined amount of time after the first drone data is collected. The second drone data may be collected to determine whether the policyholder complied with the recommendation by following at least the minimum requirements set forth in the recommendation.

Policy generation module 428 may include instructions to facilitate external computing device 400 calculating updated pricing related to one or more renewed insurance policies (e.g., an insurance premium) based upon the amount of risk for the insured asset and/or whether the policyholder complies with the recommendation. As in the examples above, insurance premiums may be updated based upon whether the policyholder removed and/or enclosed a new addition, repaired/replaced portions of an insured home in declining condition, replaced portions of the insured home with materials resistant to a natural disaster such as a wildfire or earthquake, installed a sump pump above a predetermined threshold size, type, capacity, or redundancy, removed, repaired, and/or trimmed the trees and/or other vegetation, etc.

In one aspect, when the policyholder complies with the recommendation, insurance premiums for the renewed insurance policy may remain the same as in the previous insurance policy. When the policyholder does not comply with the recommendation, insurance premiums for the renewed policy may be increased based upon the amount of risk for the insured asset. If the policyholder reduces the amount of risk but not by enough to comply with the recommendation, the insurance premiums for the renewed insurance policy may be increased based upon the reduced amount of risk. Policy generation module 428 may include instructions to facilitate the calculation of insurance pricing using any suitable techniques, which may include traditional techniques that utilize the collected drone data. In addition to increasing insurance premiums when the policyholder does not comply with the recommendation, policy generation module 428 may also provide limitations in insurance coverage, changes in deductibles, exclusions, or may cancel or non-renew the insurance policy. For example, in coastal areas where there is a risk of hurricanes, there may be a policy exclusion that states that wind damage from a named storm will not be covered. In another example, if a roof is in very poor condition and the policyholder does not comply with a recommendation to replace the roof, the insurance policy may not cover wind, hail, or water intrusion damage to the insured asset until the roof has been replaced.

Processor 402 may execute instructions stored in policy generation module 428 to cause external computing device 400 to transmit the updated insurance pricing to a mobile computing device (e.g., to mobile computing device 300 via communication unit 404). In one aspect, the mobile computing device, upon receiving the updated insurance pricing data, may display the updated insurance pricing data related to the user's insurance policy. The policy generation module 428 may also include instructions to receive an indication from the mobile computing device of whether the policyholder accepts or declines the renewed insurance policy having the updated insurance pricing.

V. Exemplary Sequence Diagram for Loss Mitigation

Figure 5:
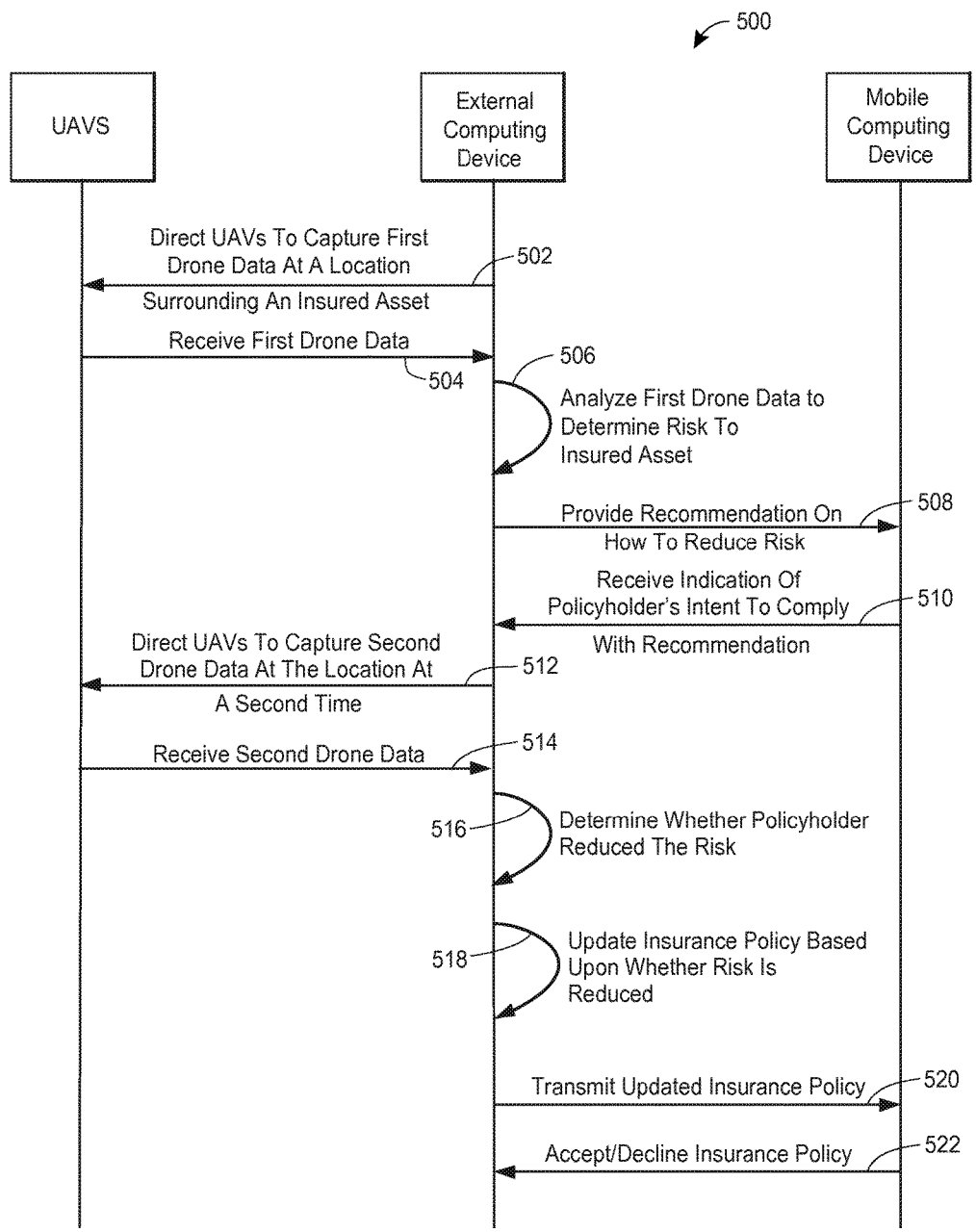
FIG. 5 illustrates an exemplary interaction 500 between the UAVs, the external computing device, and/or the mobile computing device when mitigating potential loss in accordance with an exemplary aspect of the present disclosure.

FIG. 5 illustrates an exemplary interaction 500 between the UAVs, the external computing device, and/or the mobile computing device when mitigating potential loss for an insured asset. An external computing device, such as the external computing device 400 as shown in FIG. 4, may direct one or more UAVs to capture first drone data of the insured asset and at an area surrounding an insured asset (step 502), such as UAVs 102.1-102.N, for example, as shown in FIG. 1. The first drone data may include audio, video, and/or images (e.g., thermal images, multispectral images, LiDAR) of the area, weather conditions for the area, a thermal signature for the insured asset, soil and wood samples of soil and/or trees surrounding the insured asset, etc. The external computing device may then receive the first drone data collected by the UAVs (step 504) and/or may analyze the first drone data (step 506) to determine an amount of risk to the insured asset, which may include an increased amount of risk, a decreased amount of risk, a same amount of risk, and/or a new amount of risk when compared to previously stored drone data.

For example, the first drone data may be compared to previously stored drone data which corresponds to the insured asset. If for example, a new addition has been added to the insured asset, the condition of the insured asset and/or a portion of the asset has declined, weather conditions have changed for the area surrounding the insured asset, the moisture content of the area surrounding the insured asset has increased, the amount of trees and/or other vegetation surrounding the insured asset has increased, trees and/or vegetation surrounding the insured asset have been damaged, etc., the external computing device may determine that there is an increased or new amount of risk corresponding to the insured asset. In other scenarios, the external computing device may determine that there is a decreased amount of risk or the same amount of risk when compared to the previously stored drone data which corresponds to the insured asset.

As a result, the external computing device may provide a recommendation (step 508) on how to reduce the risk to a policyholder of the insured asset via the policyholder's mobile computing device, such as the mobile computing device 300 as shown in FIG. 3. As mentioned above, the recommendation may include one or several corrective actions for the policyholder to take to reduce the risk to the insured asset. Furthermore, the recommendation may include a predetermined amount of time for the policyholder to reduce the amount of risk without an adjustment to the insurance policy upon renewal, and/or minimum requirements which the policyholder must complete within the predetermined amount of time to avoid an adjustment to, cancellation of, or non-renewal of the insurance policy upon renewal.

In some embodiments, the recommendation may also include one or several user controls for the policyholder to indicate whether she intends to comply with the recommendation. The mobile computing device may provide an indication to the external computing device of the policyholder's intent to comply with the recommendation (step 510). When the policyholder intends to comply, the external computing device may once again direct the UAVs to capture drone data which may be second drone data at the area surrounding the insured asset (step 512). The second drone data may be captured at a second date which may correspond to the predetermined amount of time after the first drone data is collected.

The external computing device may then receive the second drone data collected by the UAVs (step 514) and/or may analyze the second drone data to determine whether the policyholder reduced the amount of risk to the insured asset (step 516), for example by carrying out the provided recommendation and/or by carrying out the minimum requirements included in the provided recommendation. Insurance policy data such as insurance premiums may be updated for the renewed insurance policy based upon a reduced (or increased) amount of risk for the insured asset and/or whether the policyholder complies with the recommendation (step 518). In addition to adjusting insurance premiums, further insurance policy data may be updated for the renewed insurance policy such as limitations in insurance coverage, changes in deductibles, or exclusions. In some scenarios, the external computing device may cancel or non-renew the insurance policy.

The external computing device may transmit the renewed insurance policy for display on the mobile computing device (step 520). Additionally, the display on the mobile computing device may include one or more user controls for accepting/declining the renewed insurance policy. As a result, the policyholder may review the renewed insurance policy on her mobile computing device and select one of the user controls to indicate whether she accepts or declines. The indication may be transmitted to the external computing device (step 522).

VI. Exemplary Method for Mitigating Potential Loss

Figure 6:
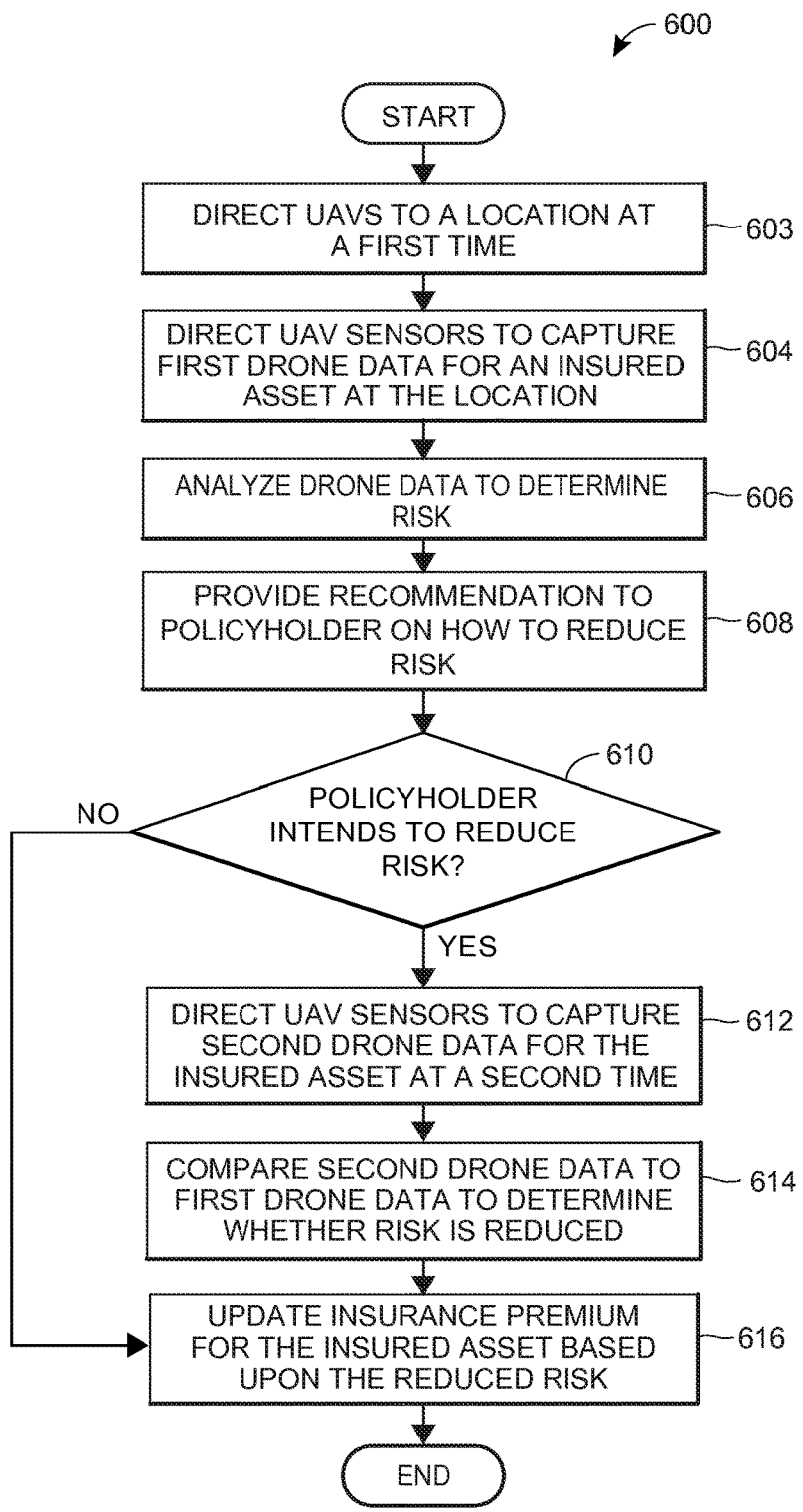
FIG. 6 illustrates an exemplary computer-implemented method 600 for mitigating potential loss using drone data in accordance with an exemplary aspect of the present disclosure.

FIG. 6 illustrates an exemplary computer-implemented method 600 for mitigating potential loss using drone data. In the present aspect, method 600 may be implemented by any suitable computing device (e.g., an external computing device such as central monitoring system 150 and/or one or more of external computing devices 160.1-160.M, as shown in FIG. 1). In the present aspect, method 600 may be performed by one or more processors, applications, and/or routines, such as processor 402 executing instructions in one or more module stored in memory 408, for example, as shown in FIG. 4.

At block 602, one or more UAVs such as UAVs 102.1-102.N, for example, as shown in FIG. 1 may be directed to an area surrounding an insured asset at a first time. For example, the UAVs may be directed to a set of geographic coordinates defined by a geofence which surrounds the insured asset.

In any event, once the UAVs arrive at the location, the UAVs may be directed to capture first drone data (block 604). In some embodiments, the UAVs may be directed to capture the first drone data at several positions within the geofenced geographic location. For example, if the insured asset is a home, the UAVs may be directed to capture first drone data on the roof of the home, from the yard and/or lot surrounding the home, from behind the home, from the street adjacent to the home, etc.

The first drone data may include, for example, an image of the roof of a home to determine its age and/or condition, proximity of the home to water sources to assess flood risks, whether the home has recently added additions that need to be additionally insured, whether the home has a pool that could represent a higher risk of a person drowning (e.g., if there is no fence surrounding the pool), whether the home is close to land that may present a risk of sinkholes, avalanches, and/or mudslides, the temperature of the home, soil and/or wood samples of the soil and/or trees surrounding the home to determine the condition of the foundation and/or the risk of a tree falling, an amount of trees and/or other vegetation surrounding the home and/or the distance from the trees and/or other vegetation to the home to assess fire risks, weather and other physical conditions for the area surrounding the home to assess natural disaster risks, etc.

In some embodiments, the UAVs may analyze the first drone data, such as wood and soil samples, in real-time or at least near real-time using additional sensors and/or instruments to determine for example, soil moisture content, the age of a tree, the degree of root damage for a tree, etc. In any event, the UAVs may transmit the first drone data to the external computing device.

At block 606, the first drone data may be analyzed to determine an amount of risk to the insured asset. In some embodiments, the first drone data may be compared to previously stored drone data collected during the initial underwriting process for the insured asset and/or a most recent re-underwriting process. An amount of risk to the insured asset may then be determined based upon the comparison. Then at block 608, the external computing device may provide a recommendation on how to reduce the risk to the mobile computing device of the policyholder.

The recommendation may be generated based upon the type of risk to the insured asset (e.g., an increased liability risk) and/or the cause of the increased risk (e.g., a new swimming pool). The recommendation may include one or several corrective actions to take to reduce the risk, indications of service providers for carrying out the corrective actions, a predetermined amount of time to comply with the recommendation to avoid an adjustment to, cancellation of, or non-renewal of the insurance policy upon renewal, and/or minimum requirements for complying with the insurance policy. Additionally, the recommendation may include user controls for selecting, on the mobile computing device, whether the policyholder intends to comply with the recommendation.

If the policyholder selects the indication that he does not intend to comply with the recommendation, the external computing device may update and/or transmit insurance policy data, such as insurance premiums for a renewed insurance policy based upon the amount of risk to the insured asset (block 616). In addition to adjusting insurance premiums, further insurance policy data may be updated for the renewed insurance policy such as limitations in insurance coverage, changes in deductibles, or exclusions. In some scenarios, the external computing device may non-renew or cancel the insurance policy. On the other hand, if the policyholder selects the indication that he intends to comply with the recommendation, the external computing device may direct the one or more UAVs to the area surrounding the insured asset at a second time to collect second drone data (block 612). The second time may correspond to the predetermined amount of time after the first time in which first drone data is collected.

The second drone data may be compared to the first drone data to determine whether the policyholder reduced the amount of risk by complying with the recommendation (block 614). For example, if the cause of a risk of trees falling is several damaged trees, the external computing device may compare images of the area surrounding the insured asset at the second time to images of the area surrounding the insured asset at the first time. The external computing device may determine the amount of the damaged trees which have been repaired/removed based upon the comparison. In another example, if the cause of a risk associated with the condition of the insured home. is worn out roofing material, the external computing device may compare images of the insured asset at the second time to images of the insured asset at the first time to determine whether the roofing material had been replaced based upon the comparison.

The external computing device may then update and/or transmit insurance policy data, such as insurance premiums for a renewed insurance policy based upon a reduced (or increased) amount of risk to the insured asset (block 616). If the policyholder complies with the recommendation, the amount of risk may be the same as the amount of risk at the time of the previous insurance policy and as a result, the insurance premiums may stay the same as in the previous insurance policy. Moreover, if the policyholder reduces the amount of risk but not by enough to comply with the recommendation, the insurance premiums for the renewed insurance policy may be adjusted based upon the reduced amount of risk. Furthermore, if the policyholder reduces the amount of risk by more than the minimum requirements for complying with the insurance policy, the renewed policy may be adjusted and the policyholder may be eligible for a discounted insurance premium. Thus, insurance cost savings may be provided to those insured that are risk averse and timely take recommended corrective actions to reduce risks to their properties. The method may include additional, fewer, or alternate actions, including those discussed elsewhere herein.

VII. Additional Technical Advantages

In the various aspects described herein, UAV 200, mobile computing device 300, and/or external computing device 400 may facilitate dispatching one or more UAVs to an area surrounding an insured asset, receiving collected first drone data, determining an amount of risk associated with the insured asset, providing a recommendation on how to reduce the amount of risk and/or adjusting insurance premiums for a renewed insurance policy based upon the amount of risk. Additionally or alternatively, these aspects may provide other benefits relating to the technical operation of UAV 200, mobile computing device 300, external computing device 400, and/or the storage devices associated therewith.

For example, by dispatching UAVs to collect drone data for an insured asset, the present aspects advantageously may mitigate loss to the insured asset in a safe, accurate, and efficient manner.

More specifically, the UAVs may collect and analyze soil and wood samples, for example, in real-time or at least near-real time using various sensors/instruments as described above (e.g., multispectral imaging sensors) to determine soil moisture content, the presence of pests, the age, number of dead sections, and degree of root damage for trees, vegetation, and/or other organic materials, which may be used to assess risk for the insured property. By contrast, traditionally soil and wood samples are transmitted to a laboratory for analysis which may take several days to complete. Therefore, by utilizing sensors/instruments coupled to the UAVs the present aspects may mitigate loss in an efficient manner.

Furthermore, in traditional re-underwriting processes, an insurance representative would ordinarily need to investigate the insured asset. For example, in order to investigate the risk and exposures of a home owner's roof, an insurance representative may have to climb onto the roof, and perform inspections while on the owner's roof. By climbing on the roof and attempting to maneuver around the roof to perform his inspection, the insurance representative opens himself to a real risk of injury, especially in difficult weather conditions where the roof may be slippery because of rain, snow, and/or ice and winds may be severe. By collecting data via UAVs, the present aspects advantageously may decrease the risk of injury to an insurance representative.

Moreover, the UAVs may allow for an accurate risk assessment of the insured asset which an insurance representative may not be able to perform. For example, UAVs may collect data from several locations/angles, such as an aerial view which an insurance representative cannot reach. Additionally, UAVs may collect data from the non-visible spectrum, which an insurance representative cannot retrieve without specialized equipment. For example, UAVs may gather tree heights and locations of trees relative to the insured asset using LiDAR and/or may collect data on the health of leaves using multispectral analysis. Thus, the present aspects advantageously may increase the accuracy of assessing risk to mitigate loss to the insured asset.

VIII. Exemplary Loss Mitigation

In one aspect, a computer-implemented method of generating an insurance recommendation from drone data may be provided. The method may include (1) receiving image, audio, and/or other drone data, at or via a remote server (and/or one or more remote processors) associated with an insurance provider, from one or more drones (or drone transceivers) via wireless communication or data transmission, the drone data received recording, showing, capturing, detailing, or otherwise being associated with real property, homes, vehicles, flood plains, rivers, streams, geographic features, trees, vegetation, foliage, fire hydrants, yards, and/or other conditions at various dates or over a period of time; (2) analyzing, at or via the remote server, the drone data received to determine a risk being generated from, caused by, or that is associated with, the conditions that has increased over a period of time to an insured property, home, vehicle, or other asset; (3) generating, at or via the remote server, a recommendation for the insured suggesting actions to take to reduce the risk to the insured property, home, vehicle, or other asset; and/or (4) updating or adjusting, at or via the remote server, a premium, rate, reward, or discount for the insurance policy of the insured or insured asset based upon the recommended action being completed or not being completed by the insured, such as within a given amount of time. The method may include additional, fewer, or alternate actions, including those discussed elsewhere herein.

For example, the method may include causing, at or via the remote server, the updated or adjusted insurance policy to be presented to the insured, such as via wireless communication; and/or accepting or receiving, at or via the remote server, approval of, or modification to, the updated or adjusted insurance policy from the insured or owner of the insured asset that is sent from a mobile or other computing device of the insured or owner.

In another aspect, a computer-implemented method of generating an insurance recommendation from drone data may be provided. The method may include (1) receiving image, audio, and/or other drone data, at or via a remote server (and/or one or more remote processors) associated with an insurance provider, from one or more drones (or drone transceivers) via wireless communication (or data transmissions) transmitted over time, the drone data received recording, showing, capturing, detailing, or otherwise being associated with environmental conditions and/or geographic features (a) that have changed or are changing over a period of time, and (b) that may impact an insured property or asset covered by an insurance policy issued by the insurance provider; (2) analyzing, at or via the remote server, the drone data received to determine an increased risk to the insured property or asset being generated from, or that is associated with, the environmental conditions and/or geographic features that have changed or are changing over time; (3) generating, at or via the remote server, a recommendation for an insured suggesting one or more recommended actions to take to reduce the increased risk to the insured property or asset determined from the drone data; and/or (4) updating or adjusting, at or via the remote server, a premium, rate, reward, or discount for the insurance policy of the insured property or asset based upon (a) the increased risk to the insured property or asset determined from the drone data showing the environmental conditions and/or geographical features that have changed over a period of time, and/or (b) the one or more recommended actions being completed or not being completed by the insured, such as within a given amount of time. As a result, insurance cost savings may be provided to those insured that are risk averse and promptly take mitigative actions. The method may include additional, fewer, or alternate actions, including those discussed elsewhere herein.

For example, the increased risk may be an increased risk of fire damage to the insured property or asset, and the insured property or asset may include real property, a home, a vehicle, and/or a boat. The increased risk of fire damage (as evidenced by the drone data received) may be determined from (i) vegetation, tree, or foliage growth, and/or (ii) the vegetation, tree, or foliage growth becoming within a predetermined threshold or distance to the insured property or asset, including an insured home. The increased risk may be an increased risk of wind damage to the insured property or asset, and the insured property or asset may include real property, a home, a vehicle, and/or a boat. The increased risk of wind damage may be determined from (i) vegetation, tree, or foliage growth, and/or (ii) the vegetation, tree, or foliage growth becoming within a predetermined threshold or distance to the insured property or asset, including an insured home. The increased risk may be an increased risk of property damage to the insured property or asset or of injury to occupants of the insured property or asset, and the insured property or asset may include real property, a home, a vehicle, and/or a boat. The increased risk of property damage (as evidenced by the drone data received) may be determined from the presence of a new fireworks distribution center built adjacent to the insured property which was not there when the risk was previously determined.

The increased risk may be an increased risk of water or flooding damage to the insured property or asset, and the insured property or asset may include real property, a home, a vehicle, and/or a boat. The increased risk of water damage may be determined from (i) ocean, lake, river, stream, beach, flood plain, or other water or water way growth or changes over time, and/or (ii) the ocean, lake, river, stream, beach, flood plain, or other water or water way becoming within a predetermined threshold or distance to the insured property or asset, including an insured home. The increased risk may be an increased risk of an avalanche, mudslide, or wildfire to the insured property or asset, and the insured property or asset may include real property, a home, a vehicle, and/or a boat.

In another aspect, a computer-implemented method of monitoring infrastructure integrity and recommending corrective actions using drone data may be provided. The method may include (1) receiving image, audio, and/or other drone data, at or via a remote server (such as a third party or insurance provider remote server or remote processor(s)), from one or more drones (or drone transceivers) via wireless communication (or data transmissions) transmitted over time, the drone data received recording, showing, capturing, detailing, or otherwise being associated with privately or publicly owned infrastructure (e.g., roads, highways, toll ways, bridges, exit ramps, street lights, sidewalks, subways, power transmission lines/grid, dams, levees, pipelines, airports, ports, marinas, etc.) conditions that have changed or are changing over a period of time, the infrastructure may or may not be covered by an insurance policy issued by the insurance provider: (2) analyzing, at or via the remote server, the drone data received to determine an increased risk to the infrastructure being generated from, or that is associated with, the infrastructure conditions that have changed or are changing over time; (3) generating, at or via the remote server, a recommendation for an insured or government entity suggesting one or more recommended actions to take to reduce the increased risk to the infrastructure determined from the drone data; and/or (4) providing the recommendation to the insured or government entity via wired or wireless communication sent from the remote server. The method may include additional, fewer, or alternate actions, including those discussed herein.

For instance, the method may include updating or adjusting, at or via the remote server, a premium, rate, reward, or discount for the insurance policy of the infrastructure based upon (a) the increased risk to the infrastructure determined from the drone data showing changes over a period of time, and/or (b) the one or more recommended actions being completed or not being completed by the insured, such as within a given amount of time.

The increased risk may be due to infrastructure integrity changes or degradation. The increased risk may be due to increased risk of fire, wind, or water damage to the infrastructure. The increased risk may be due to ocean, lake, river, stream, beach, flood plain, or other water or water way growth or changes over time.

In another aspect, a computer-implemented method of monitoring infrastructure integrity and recommending corrective actions using drones and/or drone data may be provided. The method may include (1) receiving image, audio, and/or other drone data, at or via a remote server (such as a third party or insurance provider remote server or remote processor(s)), from one or more drones (or drone transceivers) via wireless communication (or data transmissions) transmitted over time, the drone data received recording, showing, capturing, detailing, or otherwise being associated with privately or publicly owned buildings (including office buildings, shopping malls, stadiums, hotels, dormitories, hospitals, and/or other large buildings), the drone data revealing building conditions and/or surrounding geographical conditions that have changed or are changing over a period of time, the buildings being covered by an insurance policy issued by the insurance provider; (2) analyzing, at or via the remote server, the drone data received to determine an increased risk to the buildings being generated from, or that is associated with, the building conditions and/or geographical conditions that have changed or are changing over time; (3) generating, at or via the remote server, a recommendation for an insured or owner of the building suggesting one or more recommended actions to take to reduce the increased risk to the building that is determined from the drone data; and/or (4) providing the recommendation to the insured or owner of the building via wired or wireless communication sent from the remote server to a computing device associated with the insured or owner of the building. The method may include additional, fewer, or alternate actions, including those discussed elsewhere herein.

For example, the method may include updating or adjusting, at or via the remote server, a premium, rate, reward, or discount for the insurance policy of the building based upon (a) the increased risk to the building determined from the drone data showing changes over a period of time, and/or (b) the one or more recommended actions being completed or not being completed by the insured, such as within a given amount of time.

The increased risk may be due to infrastructure integrity changes or degradation. The increased risk may be due to increased risk of fire, wind, or water damage to the building. The increased risk may be due to ocean, lake, river, stream, beach, flood plain, or other water or water way growth or changes over time.

IX. Exemplary Method of Mitigating Potential Loss Using Drone Data

In another aspect, a computer-implemented method of mitigating potential loss using drone data may be provided. The method may include (1) receiving (via one or more processors, and/or wired or wireless communication and/or data transmission) first drone data captured by one or more sensors communicatively coupled to one or more unmanned aerial vehicles, wherein the first drone data corresponds to an asset insured by an insurance provider via an insurance policy and the first drone data is captured at a first date; (2) analyzing (via the one or more processors) the first drone data corresponding to the insured asset to determine an amount of risk associated with the insured asset; and/or (3)

providing (via the one or more processors and/or wired or wireless communication and/or data transmission) a recommendation to a policyholder of the insured asset on how to reduce the amount of risk, wherein the recommendation includes a predetermined amount of time for the policyholder to reduce the amount of risk without an adjustment to the insurance policy. The method may further include (4) receiving (via the one or more processors and/or wired or wireless communication and/or data transmission) second drone data captured by the one or more sensors for the one or more unmanned aerial vehicles, wherein the second drone data corresponds to the insured asset and the second drone data is captured at a second date within the predetermined amount of time from the first date; and/or (5) updating (via the one or more processors) insurance policy data for the insurance policy based upon whether the policyholder complies with the provided recommendation according to the second drone data to facilitate providing insurance cost savings to risk averse policyholders.

The method may also include comparing (via the one or more processors) the second drone data to the first drone data; and/or determining (via the one or more processors) whether the policyholder complies with the provided recommendation based upon the comparison. Moreover, the method may include transmitting (via the one or more processors and/or wired or wireless communication and/or data transmission) the insurance policy including the updated insurance policy data to a mobile computing device of the policyholder upon renewal of the insurance policy; and/or receiving (via the one or more processors and/or wired or wireless communication and/or data transmission) from the mobile computing device of the policyholder, an indication of whether the policyholder accepts the renewed insurance policy. The method may include additional, fewer, or alternative actions, including those discussed elsewhere herein.

For instance, when the policyholder does not comply with the provided recommendation, the act of updating insurance policy data for the insurance policy may include increasing (via the one or more processors) an insurance premium upon renewal of the insurance policy based upon the amount of risk associated with the insured asset. When the policyholder complies with the provided recommendation, the act of updating insurance policy data for the insurance policy may include maintaining (via the one or more processors) a same insurance premium upon renewal of the insurance policy.

The insured asset may be a home, the first drone data may include images of vegetation within a predetermined distance of the home, and the amount of risk may correspond to a risk of fire based upon the distance of the vegetation to the home. Additionally, the act of providing a recommendation to a policyholder on how to reduce the amount of risk may include providing (via the one or more processors and/or wired or wireless communication and/or data transmission) a recommendation to remove at least a portion of the vegetation that is within the predetermined distance of the home. The act of receiving second drone data may include directing (via the one or more processors and/or wired or wireless communication and/or data transmission) the one or more unmanned aerial vehicles to capture images of the vegetation within the predetermined distance of the home at the second date; and/or the insurance policy data may be updated based upon whether the portion of vegetation is removed as determined based upon the comparison of the second drone data to the first drone data.

The insured asset may be a home, the first drone data may include a soil sample of soil surrounding the home having a soil moisture content above a predetermined threshold moisture content level, and the amount of risk may correspond to a risk of sewer and/or drain backup based upon the soil moisture content level. Additionally, the act of providing a recommendation to a policyholder on how to reduce the amount of risk may include providing (via the one or more processors and/or wired or wireless communication and/or data transmission) a recommendation to install a sump pump above a predetermined threshold size, type, capacity, or redundancy to mitigate sewer and/or drain backup risk.

The insured asset may be a home, the first drone data may include a wood and a soil sample of a tree surrounding the home, and the amount of risk may correspond to a risk of the tree falling based upon at least one of: (i) a number and size of dead sections of the tree, (ii) a degree of root damage, (iii) a number of dead branches, or (iv) an age of the tree. Additionally, the act of providing a recommendation to a policyholder on how to reduce the amount of risk may include providing (via the one or more processors and/or wired or wireless communication and/or data transmission) a recommendation to remove or repair the tree. The act of receiving second drone data may include directing (via the one or more processors and/or wired or wireless communication and/or data transmission) the one or more unmanned aerial vehicles to capture images of the tree at the second date; and/or the insurance policy data may be updated based upon whether the tree has been removed or repaired by the second date.

The policyholder may comply with the provided recommendation when the risk is reduced by more than a predetermined threshold amount. Moreover, the recommendation may include one or more corrective actions to take and the policyholder may comply with the provided recommendation when the policyholder carries out more than a predetermined threshold number of the one or more corrective actions.

X. Exemplary System of Mitigating Potential Loss Using Drone Data

In yet another aspect, a system of mitigating potential loss using drone data may be provided. The system may include one or more processors, a communication network, and/or a non-transitory, tangible computer-readable memory coupled to the one or more processors and the communication network and storing machine readable instructions, that when executed by the one or more processors, may cause the system to perform various tasks. For example, the instructions may cause the system to: (1) receive, via the communication network, first drone data captured by one or more sensors communicatively coupled to one or more unmanned aerial vehicles, wherein the first drone data corresponds to an asset insured by an insurance provider via an insurance policy and the first drone data is captured at a first date; (2) analyze the first drone data corresponding to the insured asset to determine an amount of risk associated with the insured asset; and/or (3) provide, via the communication network, a recommendation to a policyholder of the insured asset on how to reduce the amount of risk, wherein the recommendation includes a predetermined amount of time for the policyholder to reduce the amount of risk without an adjustment to the insurance policy. The instructions may further cause the system to (4) receive, via the communication network, second drone data captured by the one or more sensors for the one or more unmanned aerial vehicles, wherein the second drone data corresponds to the insured asset and the second drone data is captured at a second date within the predetermined amount of time from the first date; and/or (5) update insurance policy data for the insurance policy based upon whether the policyholder complies with the provided recommendation according to the second drone data to facilitate providing insurance cost savings to risk averse policyholders. The system may include additional, fewer, or alternate components and/or functionality, including that discussed elsewhere herein.

For instance, the instructions may cause the system to compare the second drone data to the first drone data; and/or determine whether the policyholder complies with the provided recommendation based upon the comparison. Moreover, the instructions may cause the system to transmit, via the communication network, the insurance policy including the updated insurance policy data to a mobile computing device of the policyholder upon renewal of the insurance policy; and/or receive, via the communication network and from the mobile computing device of the policyholder, an indication of whether the policyholder accepts the renewed insurance policy.

When the policyholder does not comply with the provided recommendation, to update insurance policy data for the insurance policy, the instructions may cause the system to increase an insurance premium upon renewal of the insurance policy based upon the amount of risk associated with the insured asset. When the policyholder complies with the provided recommendation, to update insurance policy data for the insurance policy, the instructions may cause the system to maintain a same insurance premium upon renewal of the insurance policy.

The insured asset may be a home, the first drone data may include images of vegetation within a predetermined distance of the home, and the amount of risk may correspond to a risk of fire based upon the distance of the vegetation to the home. Additionally, to provide a recommendation to a policyholder on how to reduce the amount of risk, the instructions may cause the system to provide a recommendation to remove at least a portion of the vegetation that is within the predetermined distance of the home. To receive second drone data, the instructions may cause the system to direct the one or more unmanned aerial vehicles to capture images of the vegetation within the predetermined distance of the home at the second date; and/or the insurance policy data may be updated based upon whether the portion of vegetation is removed as determined based upon the comparison of the second drone data to the first drone data.

The insured asset may be a home, the first drone data may include a soil sample of soil surrounding the home having a soil moisture content above a predetermined threshold moisture content level, and the amount of risk may correspond to a risk of sewer and/or drain backup based upon the soil moisture content level. Additionally, to provide a recommendation to a policyholder on how to reduce the amount of risk, the instructions may cause the system to provide a recommendation to install a sump pump above a predetermined threshold size, type, capacity, or redundancy to mitigate sewer and/or drain backup risk.

The insured asset may be a home, the first drone data may include a wood and a soil sample of a tree surrounding the home, and the amount of risk may correspond to a risk of the tree falling based upon at least one of: (i) a number and size of dead sections of the tree, (ii) a degree of root damage, (iii) a number of dead branches, or (iv) an age of the tree. Additionally, to provide a recommendation to a policyholder on how to reduce the amount of risk, the instructions may cause the system to provide a recommendation to remove or repair the tree. To receive second drone data, the instructions may cause the system to direct the one or more unmanned aerial vehicles to capture images of the tree at the second date; and/or the insurance policy data may be updated based upon whether the tree has been removed or repaired by the second date.

The policyholder may comply with the provided recommendation when the risk is reduced by more than a predetermined threshold amount. Moreover, the recommendation may include one or more corrective actions to take and the policyholder may comply with the provided recommendation when the policyholder carries out more than a predetermined threshold number of the one or more corrective actions.

XI. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

With the foregoing, an insurance customer may opt into a rewards, insurance discount, or other type of program. After the insurance customer provides their affirmative consent, an insurance provider drone or UAV may collect image data of insured assets before (and/or after) an insurance-related event, including those events discussed elsewhere herein. Risks, and/or lack thereof, may be identified from computer analysis of the drone data. Recommendations to mitigate risk may be generated and transmitted to insurance customers to allow them to take corrective action. In return, risk averse drivers, and/or vehicle or home owners may receive discounts or insurance cost savings related to auto, home, and other types of insurance from the insurance provider.

In one aspect, drone or UAV data, and/or other data, including the types of data discussed elsewhere herein, may be collected or received by an insurance provider remote server, such as via direct or indirect wireless communication or data transmission from a drone or UAV, after a customer affirmatively consents or otherwise opts into an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as vehicles or homes, and/or (ii) vehicle operators or passengers, or home occupants.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. The patent claims at the end of this patent application are not intended to be construed under 35 U.S.C. § 112(f) unless traditional means-plus-function language is expressly recited, such as "means for" or "step for" language being explicitly recited in the claim(s).

Accordingly, the term "insurance provider" as used herein, generally refers to a party and/or entity (e.g., a business and/or other organizational entity) that provides insurance products, e.g., by offering and/or issuing insurance policies. Typically, but not necessarily an insurance provider may be an insurance company. Further, an insurance provider may be any individual, group of individuals, company, corporation, and/or other type of entity that may issue insurance policies for customers, such as insurance policies associated with properties.

As used herein, the term "insured asset" may be used to refer to any asset, such as a vehicle, home, boat, real property, infrastructure, and/or other property, which is insured by an insurance provider. "Insured asset" may include property which requires re-underwriting, because for example the insurance on the property is up for renewal or circumstances have changed in such a manner that the insurance provider requires re-underwriting.

Additionally, the term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy, or if the insured or the insurer cancels the policy.

Although the embodiments discussed herein mainly focus on homeowners' insurance policies, it should be appreciated that an insurance provider may offer or provide one or more different types of insurance policies. Other types of insurance policies may include, for example, vehicle insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned.

The terms "insured," "insured party," "policyholder," and "customer," are used interchangeably herein to refer to a person, party, or entity (e.g., a business or other organizational entity) that is covered by the insurance policy, e.g., whose insured article or entity (e.g., property, life, health, auto, home, business) is covered by the policy. Generally, the term "user" is used when referring to a person who is operating a client device and is not exclusive of the terms "customer," "passenger," "insured," "insured party," and "policyholder."

The term "real-time" as used herein, may be used to refer to information delivered and/or analyzed within a predetermined amount of time after it is collected (e.g., seconds, minutes, hours, etc.). For example, images, audio, video, thermal signatures, soil and wood samples, etc., which are analyzed to assess risk to an insured asset within a short period of time after they are collected may be referred to herein as a "real-time." The term "near real-time" as used herein, may be used to refer to information delivered and/or analyzed within a predetermined amount of time after real-time. For example, drone data may be transmitted in "near real-time" when there is a processing delay between the time the drone data is recorded and the time the drone data is transmitted (e.g., one minute, five minutes, twenty minutes, an hour, etc.).

UAVs are described throughout the disclosure as being dispatched, deployed, or otherwise instructed to travel to one or more locations to perform various functions. As will be appreciated by those of ordinary skill in the relevant art(s), UAVs may be instructed to navigate to a specific location via any suitable techniques, such as referencing a postal address, a landmark, a location received in terms of latitude and longitude coordinates, etc. When a UAV is instructed to navigate to a geographic location and/or to perform various functions associated with a geographic location, the geographic location may be defined in any suitable manner, such as a geofenced coordinate boundary, for example. Regardless of the specific purpose of the information collected by a UAV as further provided below, a UAV may receive instructions, collect information, execute various actions, store information, and/or transmit collected information in any suitable manner.

Furthermore, throughout the disclosure, functions to be performed by one or more UAVs may be explained as being performed by a single UAV, such as UAV 200, for example, for purposes of brevity. In the aspects described herein, any described aspects may be performed by a single UAV or any suitable number of additional UAVs.

In some aspects, the various UAV functions may be performed by UAVs maneuvering with or without a tethered system. For example, in some aspects, one or more UAVs may fly untethered to carryout various functions. In other aspects, however, one or more UAVs may utilize a tethering system while flying (or other means of locomotion) within a radius governed by the length of the tether. Such tethering systems may be particularly useful, for example, when higher power requirements are required, such that one or more UAVs may receive power via the tether instead of draining their respective internal batteries. UAV 200 may include additional, fewer, or alternate actions, including those discussed elsewhere herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain aspects are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or temporarily configured circuitry (e.g., configured by software) may be driven by cost/time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering aspects in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In aspects in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example aspects, the processor or processors may be located in a single location (e.g., within a home environment, an office environment or as a server farm), while in other aspects the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other example aspects, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one aspect" or "an aspect" means that a particular element, feature, structure, or characteristic described in connection with the aspect is included in at least one aspect. The appearances of the phrase "in one aspect" in various places in the specification are not necessarily all referring to the same aspect.

Upon reading this disclosure, those of skill in the art will appreciate still additional alternative structural and functional designs for executing actions with one or more UAVs, collecting information via one or more UAVs, and/or and utilizing this collected information through the disclosed principles herein. Thus, while particular aspects and applications have been illustrated and described, it is to be understood that the disclosed aspects are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A computer-implemented method of mitigating potential loss using drone data, the method comprising:
instructing, by one or more unmanned aerial vehicles, one or more sensors communicatively coupled to the one or more unmanned aerial vehicles to capture first drone data at a first date, including:
navigating to an area surrounding an insured asset;
collecting samples of data;
analyzing the sample data; and
storing the sample data as the first drone data;
wherein the one or more sensors include at least one of a soil sample extractor, a wood sample extractor, a spectrometer, or a volumetric moisture content sensor, and wherein the first drone data corresponds to an asset insured by an insurance provider via an insurance policy;
analyzing, by one or more processors, the first drone data corresponding to the insured asset to determine an amount of risk associated with the insured asset;
providing, by the one or more processors, a recommendation to a policyholder on how to reduce the amount of risk to the insured asset;
receiving, at the one or more processors, second drone data captured by the one or more sensors of the one or more unmanned aerial vehicles, wherein the second drone data corresponds to the insured asset and the second drone data is captured at a second date within a predetermined amount of time from the first date; and
updating, by the one or more processors, insurance policy data for the insurance policy based upon whether the policyholder complies with the provided recommendation according to the second drone data to facilitate providing insurance cost savings to risk averse policyholders.

2. The computer-implemented method of claim 1, wherein when the policyholder does not comply with the provided recommendation, updating insurance policy data for the insurance policy includes increasing, by the one or more processors, an insurance premium upon renewal of the insurance policy based upon the amount of risk associated with the insured asset.

3. The computer-implemented method of claim 1, wherein when the policyholder complies with the provided recommendation, updating insurance policy data for the insurance policy includes maintaining, by the one or more processors, a same insurance premium upon renewal of the insurance policy.

4. The computer-implemented method of claim 1, further comprising:
comparing, by the one or more processors, the second drone data to the first drone data; and
determining, by the one or more processors, whether the policyholder complies with the provided recommendation based upon the comparison.

5. The computer-implemented method of claim 4, wherein the insured asset is a home, the first drone data includes images of vegetation within a predetermined distance of the home, and the amount of risk corresponds to a risk of fire based upon the distance of the vegetation to the home;
wherein providing a recommendation to a policyholder on how to reduce the amount of risk includes providing a recommendation to remove at least a portion of the vegetation that is within the predetermined distance of the home;
wherein receiving second drone data includes directing the one or more unmanned aerial vehicles to capture images of the vegetation within the predetermined distance of the home at the second date; and
wherein the insurance policy data is updated based upon whether the portion of vegetation is removed as determined based upon the comparison of the second drone data to the first drone data.

6. The computer-implemented method of claim 4, wherein the insured asset is a home, the first drone data includes a soil sample of soil surrounding the home having a soil moisture content above a predetermined threshold moisture content level, and the amount of risk corresponds to a risk of sewer or drain backup based upon the soil moisture content level; and wherein providing a recommendation to a policyholder on how to reduce the amount of risk includes providing a recommendation to install a sump pump above a predetermined threshold size, type, capacity, or redundancy to mitigate the risk of sewer or drain backup.

7. The computer-implemented method of claim 4, wherein the insured asset is a home, the first drone data includes a wood and a soil sample of a tree surrounding the home, and the amount of risk corresponds to a risk of the tree falling based upon at least one of: (i) a number and size of dead sections of the tree, (ii) a degree of root damage, (iii) a number of dead branches, or (iv) an age of the tree;

wherein providing a recommendation to a policyholder on how to reduce the amount of risk includes providing a recommendation to remove or repair the tree;

wherein receiving second drone data includes directing the one or more unmanned aerial vehicles to capture images of the tree at the second date; and wherein the insurance policy data is updated based upon whether the tree has been removed or repaired by the second date.

8. The computer-implemented method of claim 1, wherein the policyholder complies with the provided recommendation when the risk is reduced by more than a predetermined threshold amount, wherein the recommendation indicates or recommends that (i) snow should be removed from a roof of an insured home, or (ii) a backup generator should be installed to mitigate risk and receive a discount.

9. The computer-implemented method of claim 1, wherein the recommendation includes one or more corrective actions to take and the policyholder complies with the provided recommendation when the policyholder carries out more than a predetermined threshold number of the one or more corrective actions.

10. The computer-implemented method of claim 1, further comprising:

transmitting, by the one or more processors, the insurance policy including the updated insurance policy data to a mobile computing device of the policyholder upon renewal of the insurance policy; and receiving, at the one or more processors from the mobile computing device of the policyholder, an indication of whether the policyholder accepts the renewed insurance policy.

11. A system of mitigating potential loss using drone data comprising:

one or more unmanned aerial vehicles communicatively coupled to one or more sensors including at least one of a soil sample extractor, a wood sample extractor, a spectrometer, or a volumetric moisture content sensor, the one or more unmanned aerial vehicles configured to capture first drone data at a first date by instructing the one or more sensors to collect the first drone data, including:

navigate to an area surrounding an insured asset;
collect samples of data;
analyze the sample data; and
store the sample data as the first drone data, wherein the first drone data corresponds to the insured asset insured by an insurance provider via an insurance policy;

one or more processors;
a communication network;

a non-transitory computer-readable memory coupled to the one or more processors, and the communication network, and storing thereon instructions that, when executed by the one or more processors, cause the system to:

analyze the first drone data corresponding to the insured asset to determine an amount of risk associated with the insured asset when compared to a previously determined amount of risk;

provide, via the communication network, a recommendation to a policyholder on how to reduce the amount of risk to the insured asset;

receive, via the communication network, second drone data captured by the one or more sensors for the one or more unmanned aerial vehicles, wherein the second drone data corresponds to the insured asset and the second drone data is captured at a second date within a predetermined amount of time from the first date; and update insurance policy data for the insurance policy based upon whether the policyholder complies with the provided recommendation according to the second drone data to facilitate providing insurance cost savings to risk averse policyholders.

12. The system of claim 11, wherein when the policyholder does not comply with the provided recommendation, to update insurance policy data for the insurance policy the instructions cause the system to increase an insurance premium upon renewal of the insurance policy based upon the amount of risk associated with the insured asset.

13. The system of claim 11, wherein when the policyholder complies with the provided recommendation, to update insurance policy data for the insurance policy the instructions cause the system to maintain a same insurance premium upon renewal of the insurance policy.

14. The system of claim 11, wherein the instructions further cause the system to:

compare the second drone data to the first drone data; and
determine whether the policyholder complies with the provided recommendation based upon the comparison.

15. The system of claim 14, wherein the insured asset is a home, the first drone data includes images of vegetation within a predetermined distance of the home, and the amount of risk corresponds to a risk of fire based upon the distance of the vegetation to the home;

wherein to provide a recommendation to a policyholder on how to reduce the amount of risk, the instructions cause the system to provide a recommendation to remove at least a portion of the vegetation that is within the predetermined distance of the home;

wherein to receive second drone data, the instructions cause the system to direct the one or more unmanned aerial vehicles to capture images of the vegetation within the predetermined distance of the home at the second date; and wherein the insurance policy data is updated based upon whether the portion of vegetation is removed as determined based upon the comparison of the second drone data to the first drone data.

16. The system of claim 14, wherein the insured asset is a home, the first drone data includes a soil sample of soil surrounding the home having a soil moisture content above a predetermined threshold moisture content level, and the amount of risk corresponds to a risk of sewer or drain backup based upon the soil moisture content level; and wherein to provide a recommendation to a policyholder on how to reduce the amount of risk, the instructions cause the system to provide a recommendation to install a sump pump above a predetermined threshold size, type, capacity, or redundancy to mitigate the risk of sewer or drain backup.

17. The system of claim 14, wherein the insured asset is a home, the first drone data includes a wood and a soil sample of a tree surrounding the home, and the amount of risk corresponds to a risk of the tree falling based upon at least one of: (i) a number and size of dead sections of the tree, (ii) a degree of root damage, (iii) a number of dead branches, or (iv) an age of the tree;
- wherein to provide a recommendation to a policyholder on how to reduce the amount of risk, the instructions cause the system to provide a recommendation to remove or repair the tree;
- wherein to receive second drone data, the instructions cause the system to direct the one or more unmanned aerial vehicles to capture images of the tree at the second date; and
- wherein the insurance policy data is updated based upon whether the tree has been removed or repaired by the second date.

18. The system of claim 11, wherein the policyholder complies with the provided recommendation when the risk is reduced by more than a predetermined threshold amount.

19. The system of claim 11, wherein the recommendation includes one or more corrective actions to take and the policyholder complies with the provided recommendation when the policyholder carries out more than a predetermined threshold number of the one or more corrective actions.

20. The system of claim 11, wherein the instructions further cause the system to:
- transmit, via the communication network, the insurance policy including the updated insurance policy data to a mobile computing device of the policyholder upon renewal of the insurance policy; and
- receive, via the communication network and from the mobile computing device of the policyholder, an indication of whether the policyholder accepts the renewed insurance policy.

* * * * *